United States Patent
Fukuda et al.

(10) Patent No.: US 10,323,453 B2
(45) Date of Patent: Jun. 18, 2019

(54) MULTIPLE-GLAZED GLASS UNIT AND GLASS PANE FOR MULTIPLE-GLAZED GLASS UNIT

(71) Applicant: Nippon Sheet Glass Company, Limited, Tokyo (JP)

(72) Inventors: Kentaro Fukuda, Hyogo (JP); Koji Iwata, Aichi (JP); Tetsuo Minaai, Kyoto (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 209 days.

(21) Appl. No.: 15/317,346

(22) PCT Filed: Jun. 11, 2015

(86) PCT No.: PCT/JP2015/002946
§ 371 (c)(1),
(2) Date: Dec. 8, 2016

(87) PCT Pub. No.: WO2015/190111
PCT Pub. Date: Dec. 17, 2015

(65) Prior Publication Data
US 2017/0114588 A1    Apr. 27, 2017

(30) Foreign Application Priority Data
Jun. 11, 2014 (JP) .................... 2014-120787

(51) Int. Cl.
*E06B 3/67* (2006.01)
*C03C 17/36* (2006.01)
(Continued)

(52) U.S. Cl.
CPC ........ *E06B 3/6715* (2013.01); *C03C 17/3417* (2013.01); *C03C 17/36* (2013.01);
(Continued)

(58) Field of Classification Search
CPC . E06B 3/6715; E06B 3/66; E06B 3/67; Y02B 80/22; Y02B 80/24; B32B 17/10055
See application file for complete search history.

(56) References Cited

U.S. PATENT DOCUMENTS

2012/0021149 A1\* 1/2012 Myli .................. C03C 17/3411
428/34
2013/0089684 A1  4/2013 Pesce et al.
2014/0010976 A1  1/2014 Gerardin et al.

FOREIGN PATENT DOCUMENTS

CN    103443044 A    12/2013
JP    2010538960     12/2010
(Continued)

OTHER PUBLICATIONS

International Search Report for PCT/JP2015/002946, dated Sep. 15, 2015, 5 pages including English translation.
(Continued)

*Primary Examiner* — Donald J Loney
(74) *Attorney, Agent, or Firm* — Hamre, Schumann, Mueller & Larson, P.C.

(57) ABSTRACT

A multiple-glazed glass unit of the present invention is adapted to separate an indoor space and an outdoor space and includes a pair of glass panes opposed across a gap layer to be spaced at a predetermined distance from each other. Low-emissivity (Low-E) films are formed on both principal surfaces of one of the pair of glass panes that is located closer to the indoor space. The low-emissivity film formed on one of the two principal surfaces that faces the indoor space has an arithmetic average surface roughness Ra of 14 nm or less. This multiple-glazed glass unit is configurable to have a higher SHGC value ever than before as well as keeping a low U-value.

20 Claims, 5 Drawing Sheets

(51) Int. Cl.
*C03C 17/34* (2006.01)
*E06B 3/66* (2006.01)
*B32B 17/10* (2006.01)

(52) U.S. Cl.
CPC ........ *C03C 17/366* (2013.01); *C03C 17/3644* (2013.01); *C03C 17/3681* (2013.01); B32B 17/10055 (2013.01); C03C 2217/94 (2013.01); E06B 3/66 (2013.01); E06B 3/67 (2013.01); Y02B 80/22 (2013.01); Y02B 80/24 (2013.01)

(56) References Cited

FOREIGN PATENT DOCUMENTS

| | | |
|---|---|---|
| JP | 2013517206 | 5/2013 |
| JP | 2013227181 | 11/2013 |
| WO | 2006091668 A1 | 8/2006 |
| WO | 2009036284 | 3/2009 |
| WO | 2011088330 | 7/2011 |
| WO | 2012110782 A1 | 8/2012 |

OTHER PUBLICATIONS

Extended European Search Report issued for corresponding European Patent Application No. 15806626.6, dated Nov. 8, 2017, 7 pages.

* cited by examiner

MULTIPLE-GLAZED GLASS UNIT AND GLASS PANE FOR MULTIPLE-GLAZED GLASS UNIT

TECHNICAL FIELD

The present invention relates to a multiple-glazed glass unit for use in window structures and to a glass pane for multiple-glazed glass units that is used in the multiple-glazed glass unit.

BACKGROUND ART

Some window structures mounted in buildings or vehicles to separate the indoor space and the outdoor space employ a multiple-glazed glass unit. The multiple-glazed glass unit includes a pair of glass panes opposed across a gap layer to be spaced at a predetermined distance from each other. Thanks to the presence of this gap layer, the window structure employing the multiple-glazed glass unit has better heat insulating properties than a window structure employing a single glass pane. The improvement in heat insulating properties of the window structure can provide a reduction in the energy required for indoor air conditioning.

In recent years, a multiple-glazed glass unit employing a glass pane having a principal surface (glass surface) on which a heat shielding film is formed has been developed in an attempt to provide heat shielding properties in addition to heat insulating properties. With the use of a window structure additionally having heat shielding properties, entry of strong sunlight into an indoor space can be reduced during daytime, and inflow of heat from an outdoor space can be decreased during night, particularly in summer. A known example of the heat shielding film is a low-emissivity film (Low-E film). For example, JP 2013-517206 A discloses a multiple-glazed glass unit including a first glass pane facing an outdoor space and a second glass pane facing an indoor space, the second glass pane having an external surface (a principal surface facing the indoor space; this surface corresponds to a fourth face (face #4) described later) on which a low-emissivity film including a transparent electrically-conductive film is formed. JP 2013-517206 A also discloses that in this glass unit, a low-emissivity film including a film containing silver may further be formed on an internal surface (a principal surface facing a gap layer; this surface corresponds to a second face (face #2) described later) of the first glass pane.

CITATION LIST

Patent Literature

Patent Literature 1: JP 2013-517206 A

SUMMARY OF INVENTION

Technical Problem

When, as in the multiple-glazed glass unit disclosed in JP 2013-517206 A, low-emissivity films are formed on two of the principal surfaces of the glass panes constituting the unit, an improvement in the heat shielding properties of the multiple-glazed glass unit (and hence the heat shielding properties of a window structure including the unit), such as a reduction in U-value (heat transmission coefficient), is expected to be achieved as compared to when a low-emissivity film is formed on only one principal surface of the glass panes.

A multiple-glazed glass unit configurable to have a high SHGC (solar heat gain coefficient) value is desired to improve the comfort of indoor environments not only in summer but also in winter and reduce the energy required for air conditioning throughout the year. However, the multiple-glazed glass unit of JP 2013-517206 A can only have a limited range of SHGC values.

An object of the present invention is to provide a multiple-glazed glass unit configurable to have a higher SHGC value than ever before as well as keeping a low U-value.

Solution to Problem

A multiple-glazed glass unit of the present invention is adapted to separate an indoor space and an outdoor space and includes a pair of glass panes opposed across a gap layer to be spaced at a predetermined distance from each other. A first low-emissivity (Low-E) film is formed on one principal surface of one of the pair of glass panes that is located closer to the indoor space, the one principal surface facing the gap layer. A second low-emissivity film is formed on the other principal surface of the one glass pane, the other principal surface facing the indoor space. The second low-emissivity film formed on the other principal surface facing the indoor space has an arithmetic average surface roughness Ra of 14 nm or less.

In a different aspect, a multiple-glazed glass unit of the present invention is adapted to separate an indoor space and an outdoor space and includes three glass panes A, B, and C. The glass pane A and the glass pane B are opposed across a first gap layer to be spaced at a predetermined distance from each other, and the glass pane B and the glass pane C are opposed across a second gap layer to be spaced at a predetermined distance from each other. A first low-emissivity (Low-E) film is formed on one principal surface of the glass pane C located closest to the indoor space among the three glass panes, the one principal surface facing the second gap layer. A second low-emissivity film is formed on the other principal surface of the glass pane C, the other principal surface facing the indoor space. A third low-emissivity film is formed on a principal surface of the glass pane A located closest to the outdoor space among the three glass panes or on a principal surface of the glass pane B located in the middle among the three glass panes, the principal surface of the glass pane A facing the glass pane B, the principal surface of the glass pane B facing the glass pane A. The second low-emissivity film formed on the other principal surface of the glass pane C facing the indoor space has an arithmetic average surface roughness Ra of 14 nm or less.

A glass pane of the present invention for multiple-glazed glass units is for use in the above multiple-glazed glass units of the present invention as the one of the glass panes that is closest to the indoor space. The glass pane bears low-emissivity (Low-E) films formed on both principal surfaces thereof, and the low-emissivity film formed on one of the principal surfaces has an arithmetic average surface roughness Ra of 14 nm or less.

Advantageous Effects of Invention

According to the present invention, it is possible to obtain a multiple-glazed glass unit configurable to have a higher SHGC value than ever before as well as keeping a low U-value.

DESCRIPTION OF EMBODIMENTS

Figure 1:
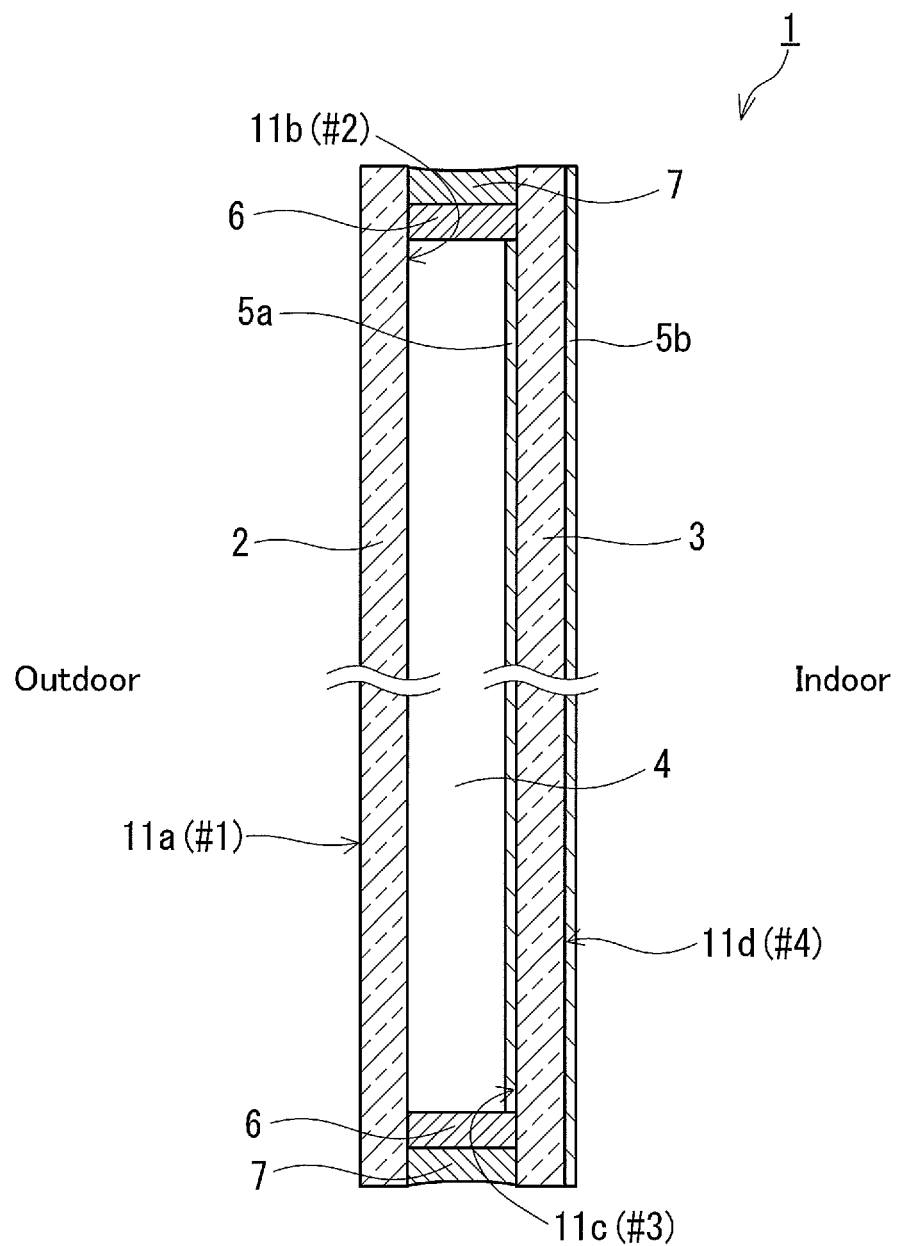
FIG. 1 is a cross-sectional view schematically showing an example of the multiple-glazed glass unit of the present invention.

A first aspect of the present disclosure provides a multiple-glazed glass unit adapted to separate an indoor space and an outdoor space, the multiple-glazed glass unit including a pair of glass panes opposed across a gap layer to be spaced at a predetermined distance from each other. A first low-emissivity (Low-E) film is formed on one principal surface of one of the pair of glass panes that is located closer to the indoor space, the one principal surface facing the gap layer. A second low-emissivity film is formed on the other principal surface of the one glass pane, the other principal surface facing the indoor space. The second low-emissivity film formed on the other principal surface facing the indoor space has an arithmetic average surface roughness Ra of 14 nm or less.

A second aspect of the present disclosure provides the multiple-glazed glass unit as set forth in the first aspect, wherein the first low-emissivity film has a first multilayer structure including: a metal layer; a sacrificial layer disposed on a surface of the metal layer facing the gap layer, the sacrificial layer being in contact with the metal layer; and a pair of dielectric layers sandwiching the metal layer and the sacrificial layer, and the second low-emissivity film has a second multilayer structure including, in order from the other principal surface on which the second low-emissivity film is formed, an underlayer, a transparent electrically-conductive oxide layer, and an amorphous layer.

A third aspect of the present disclosure provides the multiple-glazed glass unit as set forth in the second aspect, wherein the amorphous layer has a thickness of less than 40 nm.

A fourth aspect of the present disclosure provides the multiple-glazed glass unit as set forth in the second aspect, wherein the transparent electrically-conductive oxide layer includes a fluorine-doped tin oxide layer having a thickness of 120 nm or more, the amorphous layer includes a silica layer having a thickness of 15 to 70 nm, the following expression is satisfied: $d2 \geq d1 \times 0.11 + 1.4$ nm, where d1 represents a thickness of the transparent electrically-conductive oxide layer and d2 represents a thickness of the amorphous layer, and the second low-emissivity film has an emissivity ε of 0.34 or less.

A fifth aspect of the present disclosure as set forth in any one of the second to fourth aspects, wherein the first low-emissivity film has the two first multilayer structures.

A sixth aspect of the present disclosure provides the multiple-glazed glass unit as set forth in the fifth aspect, wherein a ratio d4/d3 is 1.15 or more, where d3 represents a thickness of the metal layer included in one of the two first multilayer structures that is farther from the principal surface on which the first low-emissivity film is formed, and d4 represents a thickness of the metal layer included in the other first multilayer structure closer to this principal surface, and the thickness d3 is 6 nm or more.

A seventh aspect of the present disclosure provides the multiple-glazed glass unit as set forth in any one of the first to sixth aspects, wherein a root-mean-square slope RΔq of a surface roughness profile of the second low-emissivity film is 0.77 or less.

An eighth aspect of the present disclosure provides the multiple-glazed glass unit as set forth in any one of the first to seventh aspects, wherein the second low-emissivity film further has a functional layer.

A ninth aspect of the present disclosure provides the multiple-glazed glass unit as set forth in any one of the first to eighth aspects, wherein a low-emissivity (Low-E) film is not formed on either of the principal surfaces of the other of the pair of glass panes that is located closer to the outdoor space.

A tenth aspect of the present disclosure provides the multiple-glazed glass unit as set forth in any one of the first to ninth aspects, wherein the multiple-glazed glass unit has a thickness of 22 mm or less, a U-value of 1.6 (W/(m²·K)) or less, a SHGC value of 0.4 to 0.7, and a visible light transmittance of 50 to 75%.

An eleventh aspect of the present disclosure provides the multiple-glazed glass unit as set forth in any one of the first to tenth aspects, including a figured glass pane or a wired glass pane located closer to the outdoor space than is the gap layer.

A twelfth aspect of the present disclosure provides the multiple-glazed glass unit as set forth in any one of the first to eleventh aspects, further including: an additional glass pane disposed closer to the outdoor space than a pane of the pair of glass panes that is located closer to the outdoor space; and an additional gap layer, the additional glass pane being opposed to the pane of the pair of glass panes that is located closer to the outdoor space across the additional gap layer so that the additional glass pane and the pane of the pair of glass panes that is located closer to the outdoor space are spaced at a predetermined distance from each other.

A thirteenth aspect of the present disclosure provides a glass pane for multiple-glazed glass units, the glass pane being for use in the multiple-glazed glass unit as set forth in any one of the first to twelfth aspects as the one of the pair of glass panes that is located closer to the indoor space. The glass pane bears low-emissivity (Low-E) films formed on both principal surfaces thereof, and the low-emissivity film formed on one of the principal surfaces has an arithmetic average surface roughness Ra of 14 nm or less.

A fourteenth aspect of the present disclosure discloses the glass pane for multiple-glazed glass units as set forth in the thirteenth aspect, wherein a root-mean-square slope RΔq of a surface roughness profile of the low-emissivity film formed on the one of the principal surfaces is 0.77 or less.

A fifteenth aspect of the present disclosure provides a multiple-glazed glass unit adapted to separate an indoor space and an outdoor space, the multiple-glazed glass unit including three glass panes A, B, and C. The glass pane A and the glass pane B are opposed across a first gap layer to be spaced at a predetermined distance from each other, and the glass pane B and the glass pane C are opposed across a second gap layer to be spaced at a predetermined distance from each other. A first low-emissivity (Low-E) film is formed on one principal surface of the glass pane C located closest to the indoor space among the three glass panes, the one principal surface facing the second gap layer. A second low-emissivity film is formed on the other principal surface of the glass pane C, the other principal surface facing the indoor space. A third low-emissivity film is formed on a principal surface of the glass pane A located closest to the outdoor space among the three glass panes or on a principal surface of the glass pane B located in the middle among the three glass panes, the principal surface of the glass pane A facing the glass pane B, the principal surface of the glass pane B facing the glass pane A. The second low-emissivity film formed on the other principal surface of the glass pane C facing the indoor space has an arithmetic average surface roughness Ra of 14 nm or less.

FIG. 1 shows an example of the multiple-glazed glass unit of the present invention. The multiple-glazed glass unit 1 shown in FIG. 1 includes two glass panes, one of which is a first glass pane 2 located closer to an outdoor space and the other of which is a second glass pane 3 located closer to an indoor space. The first and second glass panes 2 and 3 are opposed to each other across a gap layer 4 and form a pair of glass panes between which the gap layer 4 is held. The first and second glass panes 2 and 3 are spaced at a predetermined distance from each other, and the space formed between the two panes corresponds to the gap layer 4. The multiple-glazed glass unit 1 is incorporated, alone as a glass unit or as a part of a window assembly with a window frame (sash) portion, into a window structure of a building or vehicle, and separates the indoor space and the outdoor space. The glass unit 1 shown in FIG. 1 is constituted by the two glass panes 2 and 3, and the first glass pane 2 is disposed closest to the outdoor space and exposed to this space, while the second glass pane 3 is disposed closest to the indoor space and exposed to this space.

In the multiple-glazed glass unit 1, low-emissivity (Low-E) films 5a and 5b are respectively formed on both principal surfaces (glass surfaces) of one of the pair of glass panes 2 and 3 between which the gap layer 4 is held, specifically on the principal surfaces 11c and 11d of the second glass pane 3 located closer to the indoor space. More specifically, the first low-emissivity film 5a is formed on the principal surface 11c of the second glass pane 3 located closer to the indoor space, the principal surface 11c facing the gap layer 4, while the second low-emissivity film 5b is formed on the principal surface 11d of the second glass pane 3, the principal surface 11d facing the indoor space. Thus, the multiple-glazed glass unit 1 is configurable to have a higher SHGC (solar heat gain coefficient) value than ever before as well as keeping a low U-value (heat transmission coefficient), and the use of the unit 1 can improve the comfort of indoor environments not only in summer but also in winter and reduce the energy required for air conditioning throughout the year. Furthermore, the surface roughness Ra of that principal surface 11d of the second glass pane 3 which is exposed to the indoor space is 14 nm or less (to be precise, the surface roughness Ra of the Low-E film 5b formed on the principal surface 11d and exposed to the indoor space is 14 nm or less), which allows the indoor-facing glass surface of the multiple-glazed glass unit 1 to have good decontamination properties.

It is conventional for persons skilled in the art to denote the principal surfaces of glass panes included in a multiple-glazed glass unit as a first face, a second face, a third face, and so on in order from the one that faces the outdoor space. When this convention is applied to the insulating multiple-glazed glass unit 1 shown in FIG. 1, the principal surface 11a of the first glass 2 facing away from the gap layer 4 (the principal surface exposed to the outdoor space) is a first face (face #1), the principal surface 11b of the first glass 2 facing toward the gap layer 4 is a second face (face #2), the principal surface 11c of the second glass 3 facing toward the gap layer 4 is a third face (face #3), and the principal surface 11d of the second glass 3 facing away from the gap layer 4 (the principal surface exposed to the indoor space) is a fourth face (face #4). In the example shown in FIG. 1, the face #3 and the face #4 each bear a Low-E film.

The multiple-glazed glass unit 1 has at least two Low-E films. The unit 1 can thus have better heat shielding properties such as, typically, a lower U-value, than a multiple-glazed glass unit having only one Low-E film. The U-value of a multiple-glazed glass unit can be reduced, for example, with the use of a Low-E film including an increased number of metal layers such as silver (Ag) layers indeed; however, there is a limit to the reduction that can be achieved by using only one such a Low-E film. The use of at least two Low-E films can provide a large reduction in the U-value of a multiple-glazed glass unit beyond the limit. In the multiple-glazed glass unit 1, the Low-E films 5a and 5b are respectively formed on the two principal surfaces 11c and 11d of the second glass pane 3 disposed closer to the indoor space than is the gap layer 4. This makes it possible to configure a multiple-glazed glass unit that, as well as having the reduced U-value, shows a higher SHGC value than a multiple-glazed glass unit having two Low-E films formed on a different pair of principal surfaces.

The configurations of the Low-E films 5a and 5b are not particularly limited, and commonly-known Low-E films can be used.

An example of the Low-E films is a film including a metal layer such as a Ag layer. This film has, for example, a structure (first multilayer structure) made up of a dielectric layer, a metal layer, a sacrificial layer, and a dielectric layer that are arranged in this order from the principal surface of the glass pane on which the film is formed. In other words, this Low-E film has a first multilayer structure including: a metal layer; a sacrificial layer disposed on a surface of the metal layer facing away from the principal surface on which the film is formed, the sacrificial layer being in contact with the metal layer; and a pair of dielectric layers sandwiching the metal layer and the sacrificial layer. This Low-E film may include two or more metal layers and, in this case, the multiple-glazed glass unit is configurable to have an even lower U-value. In an example of such a case, the Low-E film can have a structure made up of a dielectric layer, a metal layer, a sacrificial layer, a dielectric layer, a metal layer, a sacrificial layer, and a dielectric layer that are arranged in this order from the principal surface of the glass pane on which the film is formed. That is, the Low-E film may have two or more first multilayer structures and, in this case, the two first multilayer structures can share the dielectric layer held between one sacrificial layer and one metal layer.

Each of the dielectric layer, metal layer, and sacrificial layer may be a single layer composed of one material or a multiple layer including two or more layers composed of different materials.

In the first multilayer structure, the dielectric layers paired with each other to sandwich the metal layer and sacrificial layer may be composed of the same material or may be composed of different materials.

When the number of the metal layers included in the Low-E film is denoted by n, the number of the dielectric layers sandwiching the metal layers is n+1 or more, and the Low-E film including the metal layer is thus typically made up of 2n+1 or more layers.

The metal layer is, for example, a Ag layer. The Ag layer is a layer containing Ag as a main component and may be a layer consisting of Ag. The "main component" of a layer as defined herein refers to a component whose content is the highest in the layer, and the content of the main component is typically 50 weight % or more, preferably 70 weight % or more, more preferably 80 weight % or more, and even more preferably 90 weight % or more. Instead of Ag, a material obtained by doping Ag with another metal such as palladium, gold, indium, zinc, tin, aluminum, or copper may be used for the metal layer.

When the Low-E film includes at least one metal layer, the total thickness of the metal layer(s) in the Low-E film is, for example, 18 to 34 nm, and preferably 22 to 29 nm.

The sacrificial layer is, for example, a layer containing as a main component at least one selected from titanium, zinc, nickel, chromium, zinc aluminum alloy, niobium, stainless steel, alloys thereof, and oxides thereof, and is preferably a layer containing as a main component at least one selected from titanium, titanium oxide, zinc, and zinc oxide. The thickness of the sacrificial layer is, for example, 0.1 to 5 nm, and preferably 0.5 to 3 nm.

The dielectric layer is, for example, a layer containing an oxide or a nitride as a main component. A more specific example of such a dielectric layer is a layer containing as a main component at least one selected from oxides and nitrides of silicon, aluminum, zinc, tin, titanium, indium, and niobium. The thickness of the dielectric layer is, for example, 8 to 120 nm, and preferably 15 to 85 nm.

The methods for forming the metal layer, sacrificial layer, and dielectric layer are not limited, and commonly-known thin film formation techniques can be used. For example, these layers can be formed by a sputtering process. That is, the Low-E film including the metal layer can be formed, for example, by a sputtering process. The dielectric layer composed of an oxide or a nitride can be formed, for example, by reactive sputtering which is a type of sputtering process. The sacrificial layer is a layer necessary for forming the dielectric layer on the metal layer by reactive sputtering (a layer that per se oxidizes to prevent oxidation of the metal layer during the reactive sputtering), and the designation "sacrificial layer" is well-known to persons skilled in the art.

Another example of the Low-E film is a multilayer film including a transparent electrically-conductive oxide layer. For example, this film has a structure (second multilayer structure) made up of an underlayer, a transparent electrically-conductive oxide layer, and an amorphous layer that are arranged in this order from the principal surface of the glass pane on which the film is formed. In other words, this Low-E film has a second multilayer structure including a transparent electrically-conductive oxide layer, an underlayer, and an amorphous layer, the underlayer and the amorphous layer sandwiching the transparent electrically-conductive oxide layer. This Low-E film may include two or more transparent electrically-conductive oxide layers.

Each of the underlayer, transparent electrically-conductive oxide layer, and amorphous layer may be a single layer composed of one material or a multiple layer including two or more layers composed of different materials.

The underlayer is, for example, a layer containing as a main component at least one selected from oxides of silicon, aluminum, zinc, and tin, and can be a layer containing as a main component at least one selected from oxides of silicon, aluminum, and zinc. The underlayer limits the movement of alkali metal ions such as sodium ions contained in the glass pane toward the transparent electrically-conductive oxide layer, thereby reducing the deterioration in the function of the oxide layer. The thickness of the underlayer is, for example, 25 to 90 nm, and preferably 35 to 70 nm. The underlayer may be made up of two or more layers having different refractive indices and, in this case, the reflected color of the Low-E film can be made close to a secondary color by adjusting the thicknesses of the layers. When the underlayer is composed of two or more layers, in particular two layers, it is preferable that one of the two layers be a first underlayer containing tin oxide or titanium oxide as a main component and the other be a second underlayer containing silicon oxide or aluminum oxide as a main component, the first underlayer and the second underlayer being arranged in this order from the principal surface of the glass pane on which the film is formed.

The transparent electrically-conductive oxide layer is, for example, a layer containing as a main component at least one selected from tin-doped indium oxide (ITO), aluminum-doped zinc oxide, antimony-doped tin oxide (SnO:Sb), and fluorine-doped tin oxide ($SnO_2$:F). The thickness of the transparent electrically-conductive oxide layer is, for example, 100 to 350 nm, and preferably 120 to 260 nm.

The amorphous layer is, for example, a layer containing as a main component at least one selected from oxides of silicon and aluminum. The amorphous layer protects the transparent electrically-conductive oxide layer and, particularly when the transparent electrically-conductive oxide layer is one formed by chemical vapor deposition (CVD), the amorphous layer has the effect of reducing the surface roughness of the oxide layer. The thickness of the amorphous layer is, for example, 10 to 70 nm, and preferably 20 to 60 nm. The upper limit of the thickness of the amorphous layer can be less than 40 nm.

A Low-E film, typically the second Low-E film exposed to the indoor space, may have a functional layer and, in this case, the functional layer can be formed on the amorphous layer. The functional layer is, for example, an antimicrobial layer or an antivirus layer. The functional layer is, for example, a $TiO_2$ layer and preferably a layer of anatase $TiO_2$.

In a specific example of the second multilayer structure, the transparent electrically-conductive oxide layer includes a fluorine-doped tin oxide layer having a thickness of 120 nm or more, and the amorphous layer includes a silica layer having a thickness of 15 to 70 nm. The fluorine-doped tin oxide layer having a thickness of 120 nm or more helps to allow the Low-E film to have an emissivity ε equal to or lower than a predetermined value. The silica layer having a thickness of 15 nm or more and 70 nm or less can reduce the variation, in particular reddening, of the reflected color of the multiple-glazed glass unit as viewed from the indoor space or the outdoor space, and at the same time decrease the surface roughness of the transparent electrically-conductive oxide layer, thereby contributing to improvement in decontamination properties of that glass surface of the multiple-glazed glass unit 1 which faces the indoor space. In this example, it is preferable that the following expression be satisfied: $d2 \geq d1 \times 0.11 + 1.4$ nm, where d1 represents the thickness of the transparent electrically-conductive oxide layer and d2 represents the thickness of the amorphous layer. In this example, the thickness d1 of the transparent electrically-conductive oxide layer is 125 nm or more, given that the thickness of the amorphous layer is equal to or greater than the thickness of the silica layer, that is, the thickness of the amorphous layer is 15 nm or more. In this example, the emissivity ε of the second Low-E film 5b may be 0.34 or less.

The methods for forming the underlayer, transparent electrically-conductive oxide layer, and amorphous layer are not limited, and commonly-known thin film formation techniques can be used. For example, these layers can be formed by a CVD process. That is, the Low-E film including the transparent electrically-conductive oxide layer can be formed, for example, by a CVD process. The thin film formation by a CVD process can be carried out "on-line" in the production process of a glass pane, more particularly in the production process of a glass pane using a float method.

The above examples of the Low-E film are only illustrative, and the configurations of the Low-E films included in the multiple-glazed glass unit 1 are not limited to those of the above examples.

In an embodiment of the multiple-glazed glass unit 1, the first Low-E film 5a formed on that principal surface 11c of the second glass pane 3 which faces the gap layer 4 has a first multilayer structure including: a metal layer; a sacrificial layer disposed on a surface of the metal layer so as to be in contact with the metal layer, the surface of the metal layer facing away from the principal surface 11c (or facing the gap layer 4); and a pair of dielectric layers sandwiching the metal layer and the sacrificial layer, while the second Low-E film 5b formed on that principal surface 11d of the second glass pane 3 which faces the indoor space has a second multilayer structure including, in order from the principal surface 11d, an underlayer, a transparent electrically-conductive oxide layer, and an amorphous layer. In the example shown in FIG. 1, the Low-E film 5b is exposed to the indoor space, and thus more susceptible to attachment of contaminants (such as a fingerprint) than the Low-E film 5a facing the gap layer 4. Additionally, the Low-E film 5b is highly subject to chemical and physical stresses applied to remove the attached contaminants or caused by contact with an object. When comparing the first multilayer structure and the second multilayer structure, the second multilayer structure has higher strength and is more chemically and physically resistant. Thus, the multiple-glazed glass unit 1 according to this embodiment has an improved durability in use.

A more specific example of this embodiment is one in which, in the second Low-E film 5b, the transparent electrically-conductive oxide layer includes a fluorine-doped tin oxide layer having a thickness of 120 nm or more, and the amorphous layer includes a silica layer having a thickness of 15 to 70 nm. As described above, the fluorine-doped tin oxide layer having a thickness of 120 nm or more helps to allow the Low-E film to have an emissivity ε equal to or lower than a predetermined value. The silica layer having a thickness of 15 nm or more and 70 nm or less can reduce the variation, in particular reddening, of the reflected color of the multiple-glazed glass unit as viewed from the indoor space or the outdoor space, and at the same time decrease the surface roughness of the transparent electrically-conductive oxide layer, thereby contributing to improvement in decontamination properties of that glass surface of the multiple-glazed glass unit 1 which faces the indoor space. In this example, it is preferable that the following expression be satisfied: $d2 \geq d1 \times 0.11 + 1.4$ nm, where d1 represents the thickness of the transparent electrically-conductive oxide layer and d2 represents the thickness of the amorphous layer. In this case, the thickness d1 of the transparent electrically-conductive oxide layer is 125 nm or more, given that the thickness of the amorphous layer is equal to or greater than the thickness of the silica layer, that is, the thickness of the amorphous layer is 15 nm or more. In this example, the emissivity ε of the second Low-E film 5b may be 0.34 or less.

Another specific example of this embodiment different from that described above is one in which the first Low-E film 5a has two first multilayer structures. In this case, the multiple-glazed glass unit 1 is configurable to have an even lower U-value. In this example, it is preferable that a ratio d4/d3 be 1.15 or more, where d3 represents the thickness of the metal layer included in one of the two first multilayer structures that is farther from the principal surface 11c on which the first Low-E film 5a is formed, and d4 represents the thickness of the metal layer included in the other first multilayer structure closer to the principal surface 11c, and that the thickness d3 be 6 nm or more. By thus adjusting the ratio d4/d3, the variation, in particular reddening, of the reflected color of the multiple-glazed glass unit 1 from the principal surface 11c and from the principal surface 11a facing the outdoor space is reduced and, at the same time, the incident angle dependence of the reflected color is decreased. This effect is significant, particularly when the sum of the thicknesses d3 and d4 of the metal layers is 27 nm or more.

The surface roughness of the second Low-E film 5b formed on that glass surface 11d of the second glass pane 3 which faces the indoor space (the face #4 in the multiple-glazed glass unit 1 shown in FIG. 1) is appropriately low. The surface roughness is such that the arithmetic average surface roughness Ra (as specified in JIS B 0601) of the Low-E film 5b is 14 nm or less, preferably 13 nm or less, and more preferably 12 nm or less. The Ra as defined herein is a value calculated from the surface height profile obtained using an atomic force microscope (AFM). The surface roughness is preferably such that the root-mean-square slope RΔq (as specified in JIS B 0601) of a surface roughness profile of the Low-E film 5b is 0.77 or less. Even when the same values are obtained for Ra, there may be a difference in the microscopic slope of surface undulation. Given such a difference in slope, it is preferable for RΔq to be 0.77 or less. The RΔq as defined herein is a value determined in three dimensions from the surface height profile obtained using an AFM. A value of RΔq determined in two dimensions is different from a value of RΔq determined in three dimensions and cannot be employed herein.

The features of the second glass pane 3 itself are not particularly limited. The second glass pane 3 is, for example, a float glass pane formed by a float method. The glass composition of the second glass pane 3 is not particularly limited either, and the second glass pane 3 is formed, for example, from a soda-lime glass composition.

The thickness of the second glass pane 3 is, for example, 2 to 15 mm, and preferably 2.5 to 6 mm.

The features of the first glass pane 2 are not particularly limited. The first glass pane 2 is, for example, a float glass pane formed by a float method, a figured glass pane, or a wired glass pane. The glass composition of the first glass pane 2 is not particularly limited either, and the first glass pane 2 is formed, for example, from a soda-lime glass composition.

The thickness of the first glass pane 2 is, for example, 2 to 15 mm, preferably 2 to 8 mm, and more preferably 2.5 to 6 mm.

The Low-E film may or may not be formed on the principal surfaces of the first glass pane 2. In the example shown in FIG. 1, a Low-E film is not formed on either of the principal surfaces of the first glass pane 2. That is, a Low-E film is not formed on either of the principal surfaces of the glass pane which is one of the pair of glass panes opposed to each other across the gap layer 4 and which is located closer to the outdoor space. When a Low-E film is not formed on that principal surface of the first glass pane 2 which faces the outdoor space, there is no need to take into account the problem of contamination of the principal surface exposed to the outdoor space, i.e., the principal surface that is exposed to the outdoor atmosphere when the multiple-glazed glass unit 1 is in use. When a Low-E film is not formed on either of the principal surfaces of the first glass pane 2, the first glass pane 2 used can be a figured glass pane or wired glass pane on the glass surface of which it is difficult to form a Low-E film. A multiple-glazed glass unit employing a figured glass pane or wired glass pane as one of the glass panes is suitable for use in a window structure of a building. As for examples of more specific merits, the figured glass pane can be expected to provide a decorative effect, and the wired glass pane can be expected to provide a crime-prevention and/or fire-prevention effect.

In the example shown in FIG. 1, the thickness of the gap layer 4 is maintained by a spacer 6 disposed on the edges (the edges of the principal surfaces facing the gap layer 4) of the pair of glass panes (the first and second glass panes 2 and 3) between which the gap layer 4 is held. The space corresponding to the gap layer 4 is hermetically closed by a sealing material 7 disposed around the outer periphery of the spacer 6. An additional sealing material may be disposed between the spacer 6 and the glass panes 2 and 3. Commonly-known components can be employed as the spacer 6 and the sealing material 7. The gap layer 4 can be injected or filled with a gas such as air (dried air) or an inert gas such as argon or krypton. For the case where the gap layer 4 is filled with a gas, the U-value of the multiple-glazed glass unit 1 can be set lower when the gas is argon than when it is air, and can be set lower when the gas is krypton than when it is argon.

The thickness of the gap layer 4 is, for example, 4 to 16 mm, and preferably 6 to 16 mm.

The thickness of the multiple-glazed glass unit 1 shown in FIG. 1 is, for example, 10 to 22 mm, and can be 12 to 22 mm.

The method for producing the multiple-glazed glass unit 1 shown in FIG. 1 is not particularly limited. The multiple-glazed glass unit 1 can be produced, for example, by a commonly-known method using the first glass pane formed by a commonly-known technique and the second glass pane formed using the thin film formation technique as described above.

Figure 2:
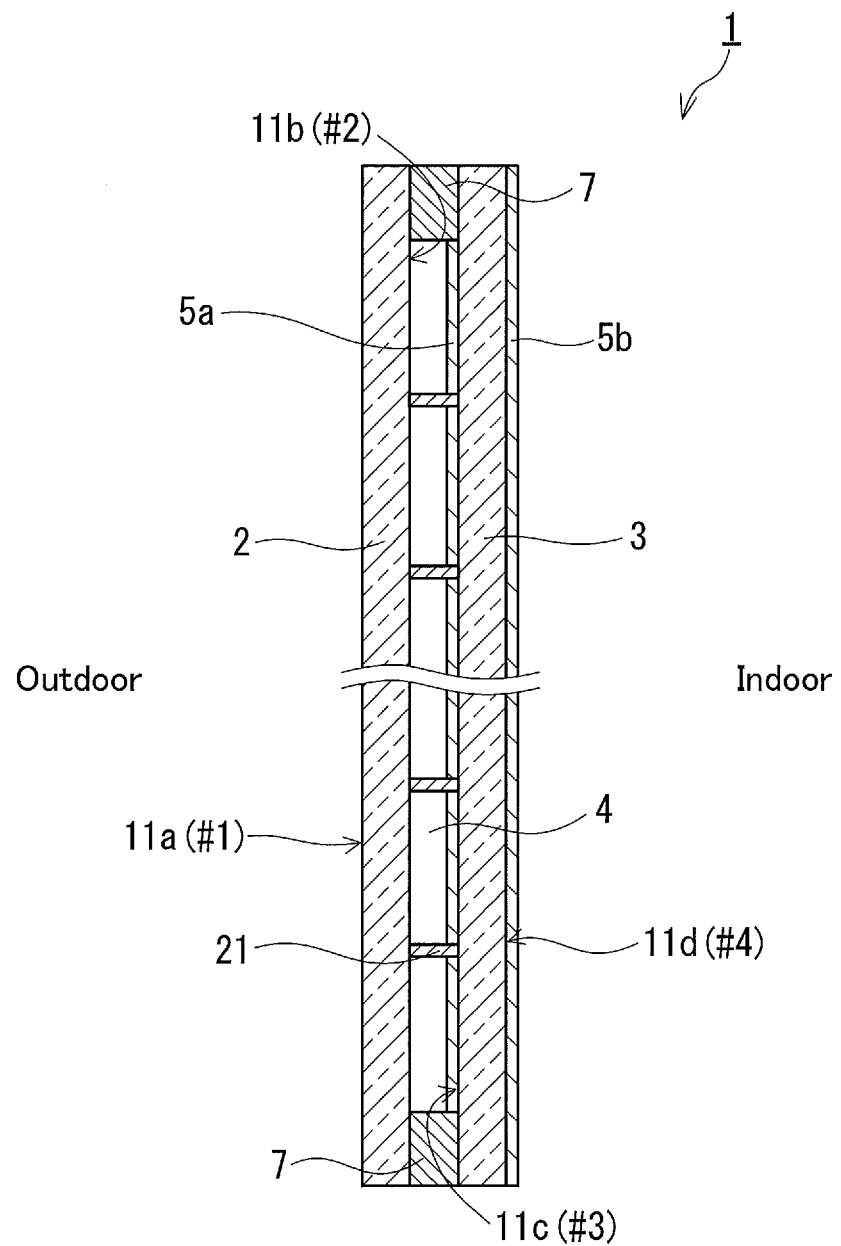
FIG. 2 is a cross-sectional view schematically showing another example of the multiple-glazed glass unit of the present invention.

The gap layer 4 may be depressurized and, in this case, the degree of depressurization is not limited. When the gap layer 4 is depressurized to a vacuum (a pressure of about 10 Pa or less), the U-value of the multiple-glazed glass unit 1 can be set even lower. FIG. 2 shows an example of the multiple-glazed glass unit in which the gap layer 4 is a vacuum layer.

The multiple-glazed glass unit 1 shown in FIG. 2 has the same configuration as the multiple-glazed glass unit 1 shown in FIG. 1, except for having a structure for more reliably keeping the gap layer 4 as a vacuum layer. Typical components for more reliably keeping the gap layer 4 as a vacuum layer are a plurality of spacers 21 disposed between the first glass pane 2 and the second glass pane 3 so that the two glass panes 2 and 3 are kept spaced across the gap layer 4 at a predetermined distance from each other. Additionally, in the multiple-glazed glass unit 1 shown in FIG. 2, the gap layer 4 is maintained at a negative pressure by the plurality of spacers 21 and the sealing material 7 disposed along the outer edge of the unit 1. The other characteristics are the same as those of the glass unit 1 shown in FIG. 1. For example, also in the glass unit 1 shown in FIG. 2, the first and second Low-E films 5a and 5b are formed on both principal surfaces of one of the pair of glass panes 2 and 3 between which the gap layer 4 is held, i.e., on the principal surfaces 11c and 11d of the second glass pane 3 located closer to the indoor space, and the surface roughness Ra of that principal surface 11d of the second glass pane 3 which is exposed to the indoor space is 14 nm or less. Commonly-known components can be used as the spacers 21 and the sealing material 7, and commonly-known arrangement can be employed for the spacers 21 and the sealing material 7.

The thickness of the gap layer 4 as a vacuum layer is, for example, 0.1 to 1 mm, and typically 0.2 mm.

The thickness of the multiple-glazed glass unit 1 shown in FIG. 2 is, for example, 6 to 12 mm, and can be 6.2 to 10.2 mm or 6.2 to 8.2 mm, since the thickness of the gap layer 4 can be reduced. There is known a window structure having a single glass pane of about 3 to 8 mm thickness fitted in a window frame (sash). Depending on its thickness, the multiple-glazed glass unit 1 shown in FIG. 2 can be substituted for the single glass pane in such a window structure. This substitution is expected, for example, to provide good heat insulating effect (i.e., a low U-value).

The method for producing the multiple-glazed glass unit 1 shown in FIG. 2 is not particularly limited either. The multiple-glazed glass unit 1 can be produced, for example, by a commonly-known method using the first glass pane formed by a commonly-known technique and the second glass pane formed using the thin film formation technique as described above.

The configuration of the multiple-glazed glass unit of the present invention is not limited as long as it includes the above first and second glass panes 2 and 3 opposed across the gap layer 4 to be spaced at a predetermined distance from each other. For example, the multiple-glazed glass unit of the present invention may include an additional glass pane other than the first and second glass panes 2 and 3. In this case, the additional glass pane is disposed closer to the outdoor space than is the first glass pane 2. That is, in this case, two or more glass panes are disposed closer to the outdoor space than is the gap layer 4 held between the first and second glass panes 2 and 3, and the second glass pane 3, which is closer to the indoor space than is the gap layer 4, is exposed to the indoor space (to be exact, the Low-E film 5b formed on the principal surface 11d is exposed to the indoor space). In other words, also in the multiple-glazed glass unit of the present invention that includes three or more glass panes, the glass pane disposed closest to the indoor space is the second glass pane 3.

For the multiple-glazed glass unit of the present invention, the number and respective features of the glass panes that are closer to the outdoor space than is the gap layer 4 held between the first and second glass panes 2 and 3 are not limited. In an embodiment, the multiple-glazed glass unit 1 includes a figured glass pane or wired glass pane disposed closer to the outdoor space than is the gap layer 4. This figured glass pane or wired glass pane may be used as the first glass pane 2 or may be used as the additional glass pane disposed closer to the outdoor space than is the first glass pane 2. The effects expected of the figured glass pane or wired glass pane are as mentioned above.

In an embodiment of the multiple-glazed glass unit including two or more glass panes closer to the outdoor space than is the gap layer 4, the multiple-glazed glass unit further includes: an additional glass pane disposed closer to the outdoor space than is the first glass pane 2 which is one of the pair of glass panes 2 and 3 and located closer to the outdoor space; and an additional gap layer, the additional glass pane being opposed to the first glass pane 2 across the additional gap layer so that the additional glass pane and the first glass pane 2 are spaced at a predetermined distance from each other. This unit includes three or more glass panes. In this unit, the glass pane located closest to the indoor space is the second glass pane 3.

Figure 3:
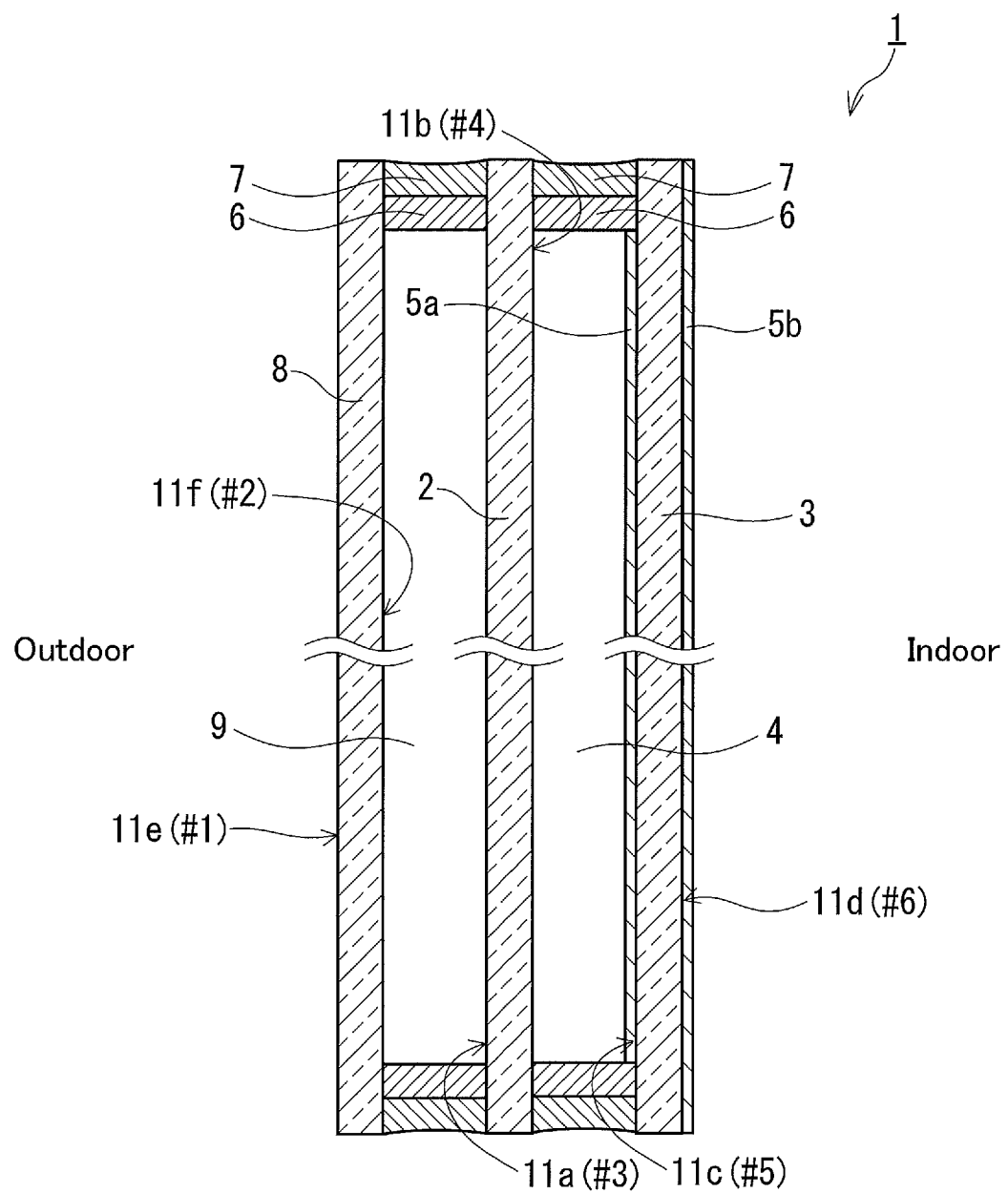
FIG. 3 is a cross-sectional view schematically showing still another example of the multiple-glazed glass unit of the present invention.

An example of such a multiple-glazed glass unit is shown in FIG. 3. The multiple-glazed glass unit 1 shown in FIG. 3 includes three glass panes (the first glass pane 2, the second glass pane 3, and a third glass pane 8). As in the multiple-glazed glass unit 1 shown in FIG. 1, the first glass pane 2 and the second glass pane 3 are opposed across the gap layer 4 to be spaced at a predetermined distance from each other. The first glass pane 2 and the third glass pane 8 are opposed across an additional gap layer 9 to be spaced at a predetermined distance from each other. In this glass unit 1, the third glass pane 8 is located closest to the outdoor space and exposed to this space, while the second glass pane 3 is located closest to the indoor space and exposed to this space. As in the glass unit 1 shown in FIG. 1, the first and second Low-E films 5a and 5b are respectively formed on both of the principal surfaces 11c and 11d of the second glass pane 3 located closest to the indoor space, and the surface roughness Ra of that principal surface 11d of the second glass 3 which is exposed to the indoor space is 14 nm or less. When the convention in the art is applied to the multiple-glazed glass unit shown in FIG. 3, the principal surface 11e of the third glass 8 facing away from the gap layer 9 (the principal surface exposed to the outdoor space) is a face #1, the principal surface 11f of the third glass 8 facing toward the gap layer 9 is a face #2, the principal surface 11a of the first glass 2 facing toward the gap layer 9 is a face #3, the principal surface 11b of the first glass 2 facing toward the gap layer 4 is a face #4, the principal surface 11c of the second glass 3 facing toward the gap layer 4 is a face #5, and the principal surface 11d of the second glass 3 facing away from the gap layer 4 (the principal surface exposed to the indoor space) is a face #6. In the glass unit 1 shown in FIG. 3, the face #5 and the face #6 each bear a Low-E film.

The features (including thickness) of the third glass pane 8 are not particularly limited, and can be the same as those of the first glass pane 2.

The multiple-glazed glass unit 1 shown in FIG. 3 is configurable to achieve a very low U-value.

The thickness of the multiple-glazed glass unit 1 shown in FIG. 3 is, for example, 17 to 41 mm, and can be 21 to 41 mm.

The method for producing the multiple-glazed glass unit 1 shown in FIG. 3 is not particularly limited. The multiple-glazed glass unit 1 can be produced, for example, by a commonly-known method using the first and third glass panes formed by a commonly-known technique and the second glass pane formed using the thin film formation technique as described above.

Figure 4:
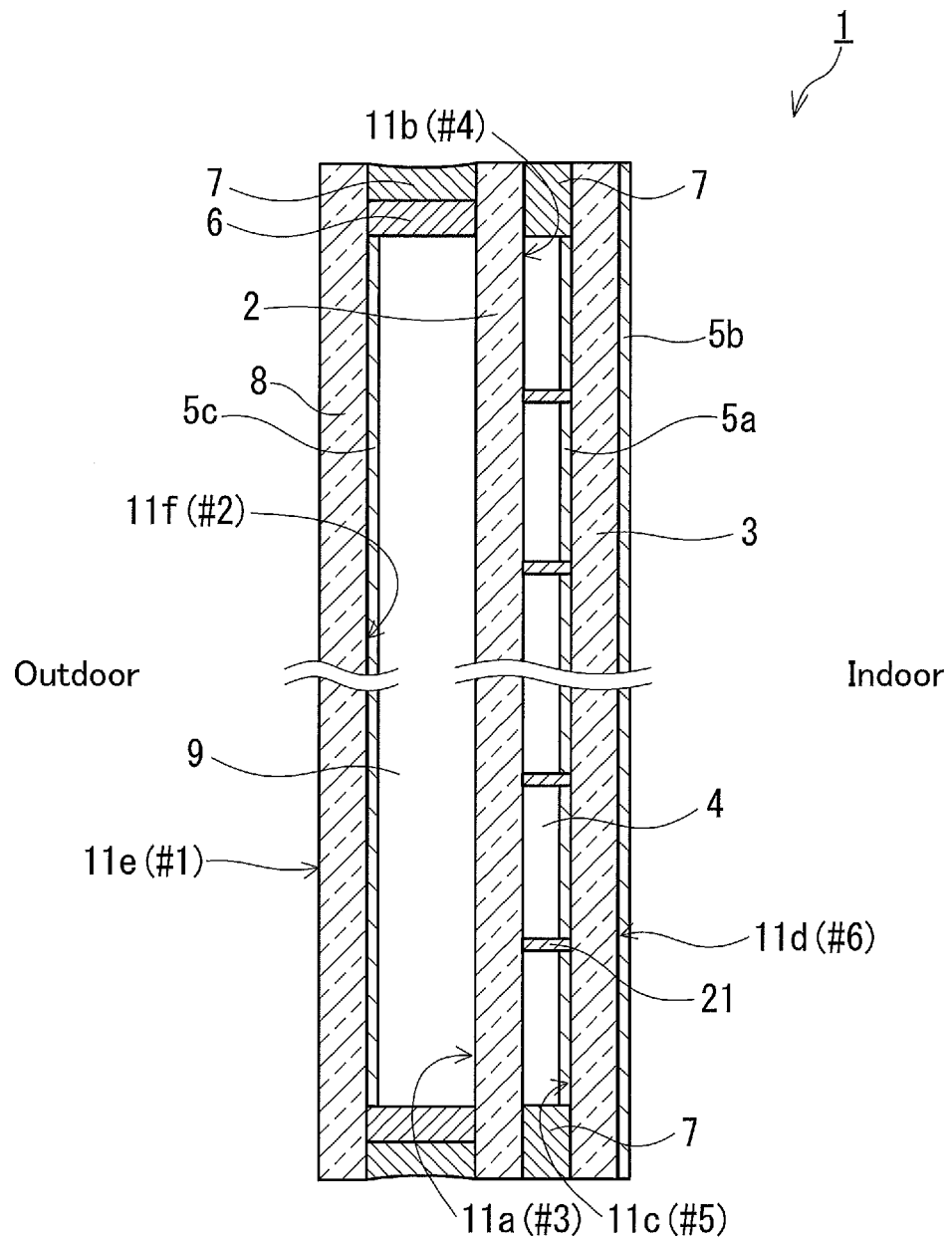
FIG. 4 is a cross-sectional view schematically showing still another example of the multiple-glazed glass unit of the present invention.

The gap layer 9 can have the same features as the gap layer 4. The features (including thickness) of the gap layer 9 and those of the gap layer 4 may be the same as or different from each other. The gap layer 4 and/or the gap layer 9 may be a vacuum layer. In this case, the U-value of the multiple-glazed glass unit 1 can be set even lower. FIG. 4 shows an example of the multiple-glazed glass unit in which the gap layer 4 held between the first glass pane 2 and the second glass pane 3 is a vacuum layer.

The multiple-glazed glass unit 1 shown in FIG. 4 has the same configuration as the multiple-glazed glass unit 1 shown in FIG. 3 which includes three glass panes, except that the multiple-glazed glass unit 1 shown in FIG. 4 has a structure for more reliably keeping the gap layer 4 as a vacuum layer, and that a third Low-E film 5c is formed on the third glass pane 8 disposed closest to the outdoor space, in particular on that principal surface (face #2) of the third glass pane 8 which faces the gap layer 9. Typical components for more reliably keeping the gap layer 4 as a vacuum layer are a plurality of spacers 21 disposed between the first glass pane 2 and the second glass pane 3 so that the two glass panes 2 and 3 are kept spaced across the gap layer 4 at a predetermined distance from each other. Additionally, in the multiple-glazed glass unit 1 shown in FIG. 4, the gap layer 4 is maintained at a negative pressure by the plurality of spacers 21 and the sealing material 7 disposed along the outer edge of the unit 1. The other characteristics are the same as those of the glass unit 1 shown in FIG. 3. For example, also in the glass unit 1 shown in FIG. 4, the first and second Low-E films 5a and 5b are formed on both principal surfaces of one of the pair of glass panes 2 and 3 between which the gap layer 4 is held, i.e., on the principal surfaces 11c and 11d of the second glass pane 3 located closer to the indoor space, and the surface roughness Ra of that principal surface 11d of the second glass pane 3 which is exposed to the indoor space is 14 nm or less. Commonly-known components can be used as the spacers 21 and the sealing material 7, and commonly-known arrangement can be employed for the spacers 21 and the sealing material 7.

Since the thickness of the gap layer as a vacuum layer can be reduced as described above, the thickness of the multiple-glazed glass unit 1 shown in FIG. 4 is, for example, 14 to 30 mm, and can be 14.2 to 29 mm or 14.2 to 21.2 mm. There is known a window structure having a conventional multiple-glazed glass unit fitted in a window frame (sash), the conventional multiple-glazed glass unit including two glass panes and having a thickness of about 12 to 22 mm. Depending on its thickness, the multiple-glazed glass unit 1 shown in FIG. 4 which includes three glass panes can be substituted for the conventional multiple-glazed glass unit including two glass panes. This substitution is expected, for example, to provide excellent heat insulating effect (a considerably low U-value).

The configuration of the third Low-E film 5c is not limited, and the third Low-E film 5c may have, for example, either the first multilayer structure or the second multilayer structure. To reduce the U-value as much as possible, it is preferable for the third Low-E film to have the first multilayer structure.

The method for producing the multiple-glazed glass unit 1 shown in FIG. 4 is not particularly limited either. The multiple-glazed glass unit 1 can be produced, for example, by a commonly-known method using the first glass pane formed by a commonly-known technique and the second glass pane and third glass pane formed using the thin film formation technique as described above.

In a multiple-glazed glass unit including three glass panes, such as in the multiple-glazed glass units 1 shown in FIGS. 3 and 4, the first glass pane 2, which is disposed as the middle glass pane, needs to have at least one principal surface on which no Low-E film is formed, and it is preferable that no Low-E film be formed on both principal surfaces of the first glass pane 2. In other words, a configuration in which Low-E films are formed on both principal surfaces of the middle glass pane cannot be employed. This is because, when a multiple-glazed glass unit including three glass panes opposed to one another across gap layers has Low-E films formed on both principal surfaces of that one of the glass panes which is disposed as the middle glass pane, this glass pane is susceptible to heating by solar radiation heat and hence to breakage (thermal fracture). Such thermal fracture is likely to occur particularly in fine winter morning during which the southward surface of the multiple-glazed glass unit is subject to a relatively large amount of solar radiation while the edge of the multiple-glazed glass unit is strongly cooled. In addition, when the gap layer that the first glass pane 2 faces is a vacuum layer, it is preferable that no Low-E film be formed on both principal surfaces of the first glass pane. This is because the presence of a Low-E film formed on at least one principal surface of the middle glass pane that faces the vacuum gap layer makes the occurrence of thermal fracture more likely as in the above case. In view of these facts, it is preferable that, when a multiple-glazed glass unit including three glass panes has a vacuum layer as the gap layer 4 held between the first glass pane 2 and the second glass pane 3, Low-E films be formed on the face #2, face #5, and face #6. In the glass unit 1 shown in FIG. 4, Low-E films are formed on the face #2, face #5, and face #6.

The glass unit 1 shown in FIG. 3 can also be specified as follows. That is, the multiple-glazed glass unit shown in FIG. 3 is a multiple-glazed glass unit adapted to separate an indoor space and an outdoor space, the multiple-glazed glass unit including three glass panes A, B, and C, wherein the glass pane A and the glass pane B are opposed across a first gap layer to be spaced at a predetermined distance from each other, the glass pane B and the glass pane C are opposed across a second gap layer to be spaced at a predetermined distance from each other, the glass pane C (second glass pane 3) located closest to the indoor space among the three glass panes bears a first Low-E film formed on one principal surface thereof facing the gap layer 4 and a second Low-E film formed on the other principal surface facing the indoor space, and the second Low-E film formed on the other principal surface facing the indoor space has an arithmetic average surface roughness Ra of 14 nm or less.

The glass unit 1 shown in FIG. 4 can also be specified as follows. That is, the multiple-glazed glass unit shown in FIG. 4 is a multiple-glazed glass unit adapted to separate an indoor space and an outdoor space, the multiple-glazed glass unit including three glass panes A, B, and C, wherein the glass pane A and the glass pane B are opposed across a first gap layer to be spaced at a predetermined distance from each other, the glass pane B and the glass pane C are opposed across a second gap layer to be spaced at a predetermined distance from each other, the glass pane C (second glass pane 3) located closest to the indoor space among the three glass panes bears a first Low-E film formed on one principal surface thereof facing the gap layer 4 and a second Low-E film formed on the other principal surface facing the indoor space, the glass pane A (third glass pane 8) located closest to the outdoor space among the three glass panes bears a third Low-E film formed on one principal surface thereof facing the glass pane B (i.e., the principal surface closer to the indoor space or the principal surface facing the gap layer 9) or the glass pane B (first glass pane 2) located in the middle among the three glass panes bears the third Low-E film formed on one principal surface thereof facing the glass pane A (i.e., the principal surface closer to the outdoor space or the principal surface facing the gap layer 9), and the second Low-E film formed on the other principal surface of the glass pane C facing the indoor space has an arithmetic average surface roughness Ra of 14 nm or less.

The multiple-glazed glass unit of the present invention is configurable to possess the following properties.

In the multiple-glazed glass unit 1 shown in FIG. 1,
the U-value is, for example, 1.6 W/(m$^2$·K) or less, and can be 1.4 W/(m$^2$·K) or less or 1.2 W/(m$^2$·K) or less depending on the configuration of the glass unit;
the SHGC value is, for example, 0.40 or more, and can be 0.45 or more, 0.50 or more, or 0.60 or more depending on the configuration of the glass unit, and the upper limit of the SHGC value is not particularly defined;
the visible light transmittance (Tvis) is, for example, 50 to 75%, preferably 50 to 70%, and more preferably 50 to 65%;
the reflectance as observed from the outdoor space is, for example, 8 to 26%, preferably 10 to 20%, and more preferably 12 to 20%; and
the reflectance as observed from the indoor space is, for example, 8 to 28%, preferably 10 to 25%, and more preferably 10 to 22%.

In the multiple-glazed glass unit 1 shown in FIG. 2,
the U-value is, for example, 1.0 W/(m$^2$·K) or less, and can be 0.9 W/(m$^2$·K) or less depending on the configuration of the glass unit;
the SHGC value is, for example, 0.45 or more, and can be 0.47 or more or 0.50 or more depending on the configuration of the glass unit, and the upper limit of the SHGC value is not particularly defined;
the visible light transmittance (Tvis) is, for example, 50 to 75%;
the reflectance as observed from the outdoor space is, for example, 10 to 25%; and
the reflectance as observed from the indoor space is, for example, 10 to 30%.

In the multiple-glazed glass unit 1 shown in FIG. 3,
the U-value is, for example, 0.93 W/(m$^2$·K) or less, and can be 0.80 W/(m$^2$·K) or less or 0.72 W/(m$^2$·K) or less depending on the configuration of the glass unit;
the SHGC value is, for example, 0.30 or more, and can be 0.32 or more or 0.36 or more depending on the configuration of the glass unit, and the upper limit of the SHGC value is not particularly defined;
the visible light transmittance (Tvis) is, for example, 45 to 60%;
the reflectance as observed from the outdoor space is, for example, 15 to 25%; and
the reflectance as observed from the indoor space is, for example, 15 to 25%.

In the multiple-glazed glass unit 1 shown in FIG. 4,
the U-value is, for example, 0.68 W/(m$^2$·K) or less, and can be 0.67 W/(m$^2$·K) or less or 0.65 W/(m$^2$·K) or less depending on the configuration of the glass unit;
the SHGC value is, for example, 0.30 or more, and can be 0.31 or more depending on the configuration of the glass unit, and the upper limit of the SHGC value is not particularly defined;
the visible light transmittance (Tvis) is, for example, 45 to 60%;
the reflectance as observed from the outdoor space is, for example, 15 to 30%; and
the reflectance as observed from the indoor space is, for example, 15 to 35%.

As for the color hue of the multiple-glazed glass unit of the present invention as viewed from the outdoor space, the a* value in the La*b* color system can be, for example, −25 to 0, preferably −20 to −4, and the b* value can be, for example, −10 to 10, preferably −5 to 5.

As for the color hue of the multiple-glazed glass unit of the present invention as viewed from the indoor space, the a* value in the La*b* color system can be, for example, −20 to 0, preferably −15 to −3, and the b* value can be, for example, −10 to 15, preferably −4 to 10.

The multiple-glazed glass unit of the present invention can achieve a low U-value and a high SHGC value even when the unit has a small thickness. For example, in an embodiment of the multiple-glazed glass unit of the present invention, typically an embodiment of the multiple-glazed glass unit of the present invention that includes two glass panes, the multiple-glazed glass unit has a thickness of 22 mm or less, a U-value of 1.6 W/(m$^2$·K) or less, a SHGC value of 0.4 to 0.7, and a visible light transmittance of 50 to 75%.

The method for producing the multiple-glazed glass unit of the present invention is not particularly limited. The multiple-glazed glass unit can be produced, for example, by a commonly-known method using the first glass pane formed by a commonly-known technique, the second glass pane formed using the thin film formation technique as described above, and, optionally, the third glass pane formed by a commonly-known technique or using the thin film formation technique as described above.

The second glass pane 3 can be commercially distributed by itself as a glass pane for multiple-glazed glass units which can be used for production of the multiple-glazed glass unit of the present invention. This glass pane for multiple-glazed glass units bears the Low-E films 5a and 5b formed on both of the principal surfaces 11c and 11d thereof, and the Low-E film 5b formed on one principal surface 11d has an arithmetic average surface roughness Ra of 14 nm or less. In addition, this glass pane for multiple-glazed glass units can have any of the preferred embodiments described above for the second glass pane 3. For example, the root-mean-square slope RΔq of a surface roughness profile of the Low-E film 5b formed on the one principal surface 11d is 0.77 or less.

The multiple-glazed glass unit of the present invention can be used in any type of window structure, alone or as a part of a window assembly including a window frame (sash) portion and the multiple-glazed glass unit fitted in the window frame portion. These window assembly and window structure, which include the multiple-glazed glass unit of the present invention, are configurable to have a higher SHGC value than ever before as well as keeping a low U-value.

EXAMPLES

Hereinafter, the present invention will be described in more detail with reference to examples. The present invention is not limited to the examples given below.

In the present examples there were fabricated: multiple-glazed glass units each including two glass panes, the two glass panes being opposed across a gap layer to be spaced at a predetermined distance from each other; and multiple-glazed glass units each including three glass panes, i.e., two glass panes opposed across a gap layer to be spaced at a predetermined distance from each other, and an additional glass pane opposed to one of the two glass panes across an additional gap layer so that the additional glass pane and the one glass pane are spaced at a predetermined distance from each other. The methods for fabricating the multiple-glazed glass units will now be described.

For each of Examples and Comparative Examples, two or three float glass panes (with a thickness of 3.0 mm) were prepared. The glass panes were each cut to a predetermined size, and Low-E films were formed on the principal surfaces of the glass panes as shown in Tables 1A to 1M presented below. In Tables 1A to 1M, the parenthesized numerals indicate the thicknesses (nm) of the layers, and "-" indicates that no Low-E film was formed.

Each multiple-glazed glass unit was produced by a method well-known to persons skilled in the art using the above two or three glass panes. The gap layers of the multiple-glazed glass units were each a gap layer filled with a predetermined gas (air or argon) or a vacuum gap layer having a reduced pressure of 1 Pa or less.

Low-E films including a metal layer (Ag layer) were formed by sputtering. The dielectric layers (denoted as "Dielectric" in Tables 1A to 1M) of the Low-E films were each a zinc oxide layer, a tin/zinc oxide layer, a tin oxide layer, a silicon nitride layer, or the like. Titanium, ZnAl, and/or titanium oxide (TiO$_x$) were used as the materials of the sacrificial layers. Low-E films including a transparent electrically-conductive oxide layer were formed by CVD.

The properties of the multiple-glazed glass units of Examples and Comparative Examples fabricated as above were evaluated as described below. The following describes the methods for evaluating the properties.

[Thermal Properties and Reflection Properties]

For each multiple-glazed glass unit, the visible light transmittance Tvis (%) at the face #1, the visible light reflectance R (%) at the face #1, the visible light reflectance R (%) at the face #4 (for the multiple-glazed glass units including two glass panes) or the face #6 (for the multiple-glazed glass units including three glass panes), and the SHGC value were determined by calculation from the results of actual measurement of the respective optical properties of the glass pane facing the outdoor space and the glass pane facing the indoor space according to JIS R 3106 ("Testing method on transmittance, reflectance and emittance of flat glasses and evaluation of solar heat gain coefficient").

In addition, for each multiple-glazed glass unit, the reflected colors of the face #1 and the face #4 (for the multiple-glazed glass units including two glass panes) or the face #6 (for the multiple-glazed glass units including three glass panes) at an incident angle of 5° were determined in the form of a* values and b* values in the La*b* color system according to JIS Z 8722 and JIS Z 8729. For the reflected colors of the faces #1 in Examples 1 and 7 to 9 and Comparative Examples 3 and 5, a* values and b* values were determined also at an incident angle of 45° to evaluate the incident angle dependence. For each of the values representing the reflected colors at an incident angle of 45°, an average of a value measured with s-polarized light and a value measured with p-polarized light was employed to eliminate the influence of the polarization plane.

[Surface Roughness of Low-E Film]

For some of Examples and Comparative Examples in which a Low-E film was formed on the face #4 (for the multiple-glazed glass units including two glass panes) or the face #6 (for the multiple-glazed glass units including three glass panes), the arithmetic average surface roughness Ra, and the root-mean-square slope RΔq of a surface roughness profile, of the Low-E film were determined according to JIS B 0601: 2013.

[Decontamination Properties]

The decontamination properties of that surface of each of the fabricated multiple-glazed glass units (the face #4 or face #6 of each multiple-glazed glass unit) which was exposed to the indoor space were evaluated as follows. First, a contaminant (a finger print, an oil-based ink, or a lipstick) was attached to the face #4 or face #6, and the contaminated portion was rubbed a predetermined number of times with a 10-cm-square cotton cloth impregnated with a cleaning agent. Breath was then blown on the rubbed portion to check for any trace of contamination. The decontamination properties were rated as "OK" when no trace of contamination was observable with naked eyes and as "NG" when a trace of contamination was observable with naked eyes. The above predetermined number of times was the number of rubs with the above-mentioned cotton cloth required to fully eliminate a trace of contamination from a commercially-available float glass having no coating on its glass surface.

<Decontamination Properties Against Fingerprint>

A finger tip of a hand was pressed against the surface to be evaluated, and a fingerprint was thus put on the surface. The cleaning agent used was deionized water, and the predetermined number of times was 20.

<Decontamination Properties Against Oil-based Felt Pen Ink>

A circle with a diameter of about 1 cm was drawn on the surface to be evaluated using a commercially-available, black, oil-based felt pen (Magic Ink (R) No. 500, manufactured by Teranishi Chemical Industry Co., Ltd.) and was dried to contaminate the surface. The cleaning agent used was a commercially-available detergent for glass (Glass Magiclean (R), manufactured by Kao Corporation), and the predetermined number of times was 50.

<Decontamination Properties Against Lipstick)

A circle with a diameter of 1 cm was drawn on the surface to be evaluated using a commercially-available lipstick (manufactured by Kanebo Cosmetics Inc.) to contaminate the surface. The cleaning agent used was a commercially-available polish remover (Nail Color Remover manufactured by Kanebo Cosmetics Inc.), and the predetermined number of times was 30.

[Likelihood of Thermal Fracture]

Among the multiple-glazed glass units including three glass panes, the units fabricated in Examples 71 to 74, Comparative Examples 71 to 78, and Examples 81 to 84 were evaluated for the likelihood of thermal fracture of the middle glass pane.

A glass pane may be set in a sash when mounted in a building. When being exposed to solar radiation, the glass pane absorbs some energy of solar radiation and rises in temperature to expand. The glass pane has a portion fitted within the sash and a portion shadowed by an eaves or the like of the building, and these portions undergo less temperature rise due to solar radiation and hence less thermal expansion, limiting the expansion of the portion exposed to solar radiation. This produces a tensile stress (thermal stress) acting on the edge portion of the glass pane in proportion to the difference in temperature between the solar-irradiated portion and the non-solar-irradiated portion which is typically the edge portion. When the thermal stress exceeds the edge strength of the glass pane, the glass pane may be fractured. This phenomenon is called thermal fracture.

The thermal stress occurring in the glass pane varies with change in glass temperature distribution caused by variation in how the glass pane is shadowed (shadow factor), increases with increase in temperature of the central portion of the glass pane caused by an indoor curtain or the like (curtain factor), increases with increase in area of the glass pane (area factor), decreases with increase in insulating effect of the sash in which the glass pane is set (edge factor, sash color), and varies depending on the typical outdoor temperature different from region to region. Thermal stresses were calculated in view of these factors. Specifically, the thermal stresses were calculated according to "Garasu Kenzai Katarogu Gijutsu Shiryo Hen (Glass Building Materials Catalog, Technical Data Edition)" published by Nippon Sheet Glass Co., Ltd., pp. 68-71 (see http://glass-catalog.jp/pdf/g46-010.pdf [December, 2014] and http://glass-catalog.jp/pdf/g60-010.pdf [revised on Jan. 20, 2015]), by employing "Single shadow" as the shadow factor, "No curtain" as the curtain factor, "Elastic sealing material+ back-up material (foamed material)" as the edge factor, "Pale color" as the sash color, and "South Kanto, Hokuriku, Tokai, Kinki, Chugoku, Shikoku, Kyusyu" in Japan as the region. It was determined that there was a likelihood of thermal fracture (YES) when the calculated thermal stress was more than the allowable stress for a float glass pane having a nominal thickness of 3 to 12 mm, and that there was no likelihood of thermal fracture (NO) when the calculated thermal stress was equal to or less than the allowable stress.

The results of the evaluation of the properties of the multiple-glazed glass units fabricated in Examples and Comparative Examples are shown in Tables 2A to 2G.

TABLE 1A

| | Outdoor-side glass pane | | | Indoor-side glass pane | |
|---|---|---|---|---|---|
| | Face #1 | Face #2 | Gap layer | Face #3 | Face #4 |
| Example 1 | — | — | Air Thickness 12 mm | Face #3/Dielectric (21)/Ag (15)/Ti (1)/Dielectric (85)/Ag (13)/Ti (1)/Dielectric (30) | Face #4/$SnO_2$ (25)/$SiO_2$ (25)/$SnO_2$:F (340)/$SiO_2$ (40) |
| Example 2 | — | — | | Face #3/Dielectric (21)/Ag (15)/Ti (1)/Dielectric (85)/Ag (13)/Ti (1)/Dielectric (30) | Face #4/$SnO_2$ (25)/$SiO_2$ (25)/$SnO_2$:F (240)/$SiO_2$ (40) |
| Example 3 | — | — | | Face #3/Dielectric (23)/Ag (10)/Ti (1)/Dielectric (76)/Ag (13)/Ti (1)/Dielectric (30) | Face #4/$SnO_2$ (25)/$SiO_2$ (25)/$SnO_2$:F (240)/$SiO_2$ (40) |
| Example 4 | — | — | | Face #3/Dielectric (23)/Ag (13)/Ti (1)/Dielectric (76)/Ag (10)/Ti (1)/Dielectric (30) | Face #4/$SnO_2$ (25)/$SiO_2$ (25)/$SnO_2$:F (240)/$SiO_2$ (40) |
| Example 5 | — | — | | Face #3/Dielectric (22)/Ag (15)/Ti (1)/Dielectric (83)/Ag (13)/Ti (1)/Dielectric (30) | Face #4/$SnO_2$ (25)/$SiO_2$ (25)/$SnO_2$:F (195)/$SiO_2$ (40) |
| Example 6 | — | — | | Face #3/Dielectric (22)/Ag (15)/Ti (1)/Dielectric (81)/Ag (13)/Ti (1)/Dielectric (30) | Face #4/$SnO_2$ (25)/$SiO_2$ (25)/$SnO_2$:F (155)/$SiO_2$ (25) |

TABLE 1A-continued

| | Outdoor-side glass pane | | | Indoor-side glass pane | |
|---|---|---|---|---|---|
| | Face #1 | Face #2 | Gap layer | Face #3 | Face #4 |
| Example 7 | — | — | | Face #3/Dielectric (22)/Ag (13)/Ti (1)/Dielectric (80)/Ag (15)/Ti (1)/Dielectric (32) | Face #4/SnO$_2$ (25)/SiO$_2$ (25)/SnO$_2$:F (340)/SiO$_2$ (40) |
| Example 8 | — | — | | Face #3/Dielectric (29)/Ag (10)/ZnAl (1)/Dielectric (81)/Ag (15)/ZnAl (1)/Dielectric (39) | Face #4/SnO$_2$ (20)/SiO$_2$ (21)/SnO$_2$:F (155)/SiO$_2$ (25) |
| Example 9 | — | — | | Face #3/Dielectric (29)/Ag (10)/ZnAl (1)/Dielectric (81)/Ag (15)/ZnAl (1)/Dielectric (39) | Face #4/SnO$_2$ (18)/SiO$_2$ (18)/SnO$_2$:F (175)/SiO$_2$ (38) |

TABLE 1B

| | Outdoor-side glass pane | | Gap layer | Indoor-side glass pane | |
|---|---|---|---|---|---|
| | Face #1 | Face #2 | | Face #3 | Face #4 |
| Comparative Example 1 | — | — | Air Thickness 12 mm | — | — |
| Comparative Example 2 | — | Face #2/Dielectric (15)/Ag (7)/Ti (2)/Dielectric (70)/Ag (12)/Ti (2)/Dielectric (25) | | — | — |
| Comparative Example 3 | — | Face #2/Dielectric (21)/Ag (15)/Ti (1)/Dielectric (85)/Ag (13)/Ti (1)/Dielectric (30) | | — | — |
| Comparative Example 4 | — | Face #2/Dielectric (21)/Ag (15)/Ti (1)/Dielectric (85)/Ag (13)/Ti (1)/Dielectric (30) | | — | Face #4/SnO$_2$ (25)/SiO$_2$ (25)/SnO$_2$:F (340) |
| Comparative Example 5 | — | — | | Face #3/Dielectric (21)/Ag (15)/Ti (1)/Dielectric (85)/Ag (13)/Ti (1)/Dielectric (30) | Face #4/SnO$_2$ (25)/SiO$_2$ (25)/SnO$_2$:F (340) |
| Comparative Example 6 | — | Face #2/Dielectric (29)/Ag (10)/ZnAl (1)/Dielectric (81)/Ag (15)/ZnAl (1)/Dielectric (39) | | Face #3/Dielectric (29)/Ag (10)/ZnAl (1)Dielectric (81)/Ag (15)/ZnAl (1)/Dielectric (39) | — |
| Comparative Example 7 | — | Face #2/Dielectric (29)/Ag (10)/ZnAl (1)/Dielectric (81)/Ag (15)/ZnAl (1)/Dielectric (39) | | — | Face #4/SnO$_2$ (25)/SiO$_2$ (21)/SnO$_2$:F (155)/SiO$_2$ (25) |
| Comparative Example 8 | — | Face #2/Dielectric (29)/Ag (10)/ZnAl (1)/Dielectric (81)/Ag (15)/ZnAl (1)/Dielectric (39) | | — | Face #4/SnO$_2$ (18)/SiO$_2$ (18)/SnO$_2$:F (175)/SiO$_2$ (38) |

TABLE 1C

| | Outdoor-side glass pane | | | Indoor-side glass pane | |
|---|---|---|---|---|---|
| | Face #1 | Face #2 | Gap layer | Face #3 | Face #4 |
| Example 11 | — | — | Argon Thickness 12 mm | Face #3/Dielectric (21)/Ag (15)/Ti (1)/Dielectric (85)/Ag (13)/Ti (1)/Dielectric (30) | Face #4/SnO$_2$ (25)/SiO$_2$ (25)/SnO$_2$:F (340)/SiO$_2$ (40) |
| Example 12 | — | — | | Face #3/Dielectric (21)/Ag (15)/Ti (1)/Dielectric (85)/Ag (13)/Ti (1)/Dielectric (30) | Face #4/SnO$_2$ (25)/SiO$_2$ (25)/SnO$_2$:F (240)/SiO$_2$ (40) |
| Example 13 | — | — | | Face #3/Dielectric (23)/Ag (10)/Ti (1)/Dielectric (76)/Ag (13)/Ti (1)/Dielectric (30) | Face #4/SnO$_2$ (25)/SiO$_2$ (25)/SnO$_2$:F (240)/SiO$_2$ (40) |
| Example 14 | — | — | | Face #3/Dielectric (22)/Ag (15)/Ti (1)/Dielectric (83)/Ag (13)/Ti (1)/Dielectric (30) | Face #4/SnO$_2$ (25)/SiO$_2$ (25)/SnO$_2$:F (195)/SiO$_2$ (40) |
| Example 15 | — | — | | Face #3/Dielectric (22)/Ag (15)/Ti (1)/Dielectric (81)/Ag (13)/Ti (1)/Dielectric (30) | Face #4/SnO$_2$ (25)/SiO$_2$ (25)/SnO$_2$:F (155)/SiO$_2$ (25) |

TABLE 1C-continued

| | Outdoor-side glass pane | | | Indoor-side glass pane | |
|---|---|---|---|---|---|
| | Face #1 | Face #2 | Gap layer | Face #3 | Face #4 |
| Example 16 | — | — | | Face #3/Dielectric (29)/Ag (10)/ZnAl (1)/Dielectric (81)/Ag (16.2)/ZnAl (1)/Dielectric (39) | Face #4/SnO$_2$ (20)/SiO$_2$ (21)/SnO$_2$:F (155)/SiO$_2$ (25) |
| Example 17 | — | — | | Face #3/Dielectric (29)/Ag (10)/ZnAl (1)/Dielectric (81)/Ag (15)/ZnAl (1)/Dielectric (39) | Face #4/SnO$_2$ (18)/SiO$_2$ (18)/SnO$_2$:F (175)/SiO$_2$ (38) |

TABLE 1D

| | Outdoor-side glass pane | | | Indoor-side glass pane | |
|---|---|---|---|---|---|
| | Face #1 | Face #2 | Gap layer | Face #3 | Face #4 |
| Example 21 | — | — | Air Thickness 12 mm | Face #3/Dielectric (34)/Ag (10.7)/ZnAl (1)/Dielectric (42) | Face #4/SnO$_2$ (20)/SiO$_2$ (21)/SnO$_2$:F (155)/SiO$_2$ (25) |
| Example 22 | — | — | | Face #3/Dielectric (34)/Ag (9.5)/ZnAl (1)/Dielectric (42) | Face #4/SnO$_2$ (18)/SiO$_2$ (18)/SnO$_2$:F (175)/SiO$_2$ (38) |

TABLE 1E

| | Outdoor-side glass pane | | | Indoor-side glass pane | |
|---|---|---|---|---|---|
| | Face #1 | Face #2 | Gap layer | Face #3 | Face #4 |
| Example 31 | — | — | Argon Thickness 12 mm | Face #3/Dielectric (34)/Ag (10.7)/ZnAl (1)/Dielectric (42) | Face #4/SnO$_2$ (20)/SiO$_2$ (21)/SnO$_2$:F (155)/SiO$_2$ (25) |
| Example 32 | — | — | | Face #3/Dielectric (34)/Ag (9.5)/ZnAl (1)/Dielectric (42) | Face #4/SnO$_2$ (18)/SiO$_2$ (18)/SnO$_2$:F (175)/SiO$_2$ (38) |

TABLE 1F

| | Outdoor-side glass pane | | | Indoor-side glass pane | |
|---|---|---|---|---|---|
| | Face #1 | Face #2 | Gap layer | Face #3 | Face #4 |
| Example 41 | — | — | Vacuum Thickness 0.2 mm | Face #3/Dielectric (22)/Ag (10)/Ti (1)/Dielectric (77)/Ag (12)/Ti (1)/Dielectric (36) | Face #4/SnO$_2$ (20)/SiO$_2$ (21)/SnO$_2$:F (155)/SiO$_2$ (25) |
| Example 42 | — | — | | Face #3/Dielectric (22)/Ag (10)/Ti (1)/Dielectric (77)/Ag (12)/Ti (1)/Dielectric (36) | Face #4/SnO$_2$ (18)/SiO$_2$ (18)/SnO$_2$:F (175)/SiO$_2$ (38) |
| Comparative Example 41 | — | Face #2/Dielectric (22)/Ag (10)/Ti (1)/Dielectric (77)/Ag (12)/Ti (1)/Dielectric (36) | | — | Face #4/SnO$_2$ (20)/SiO$_2$ (21)/SnO$_2$:F (155)/SiO$_2$ (25) |
| Comparative Example 42 | — | Face #2/Dielectric (22)/Ag (10)/Ti (1)/Dielectric (77)/Ag (12)/Ti (1)/Dielectric (36) | | — | Face #4/SnO$_2$ (18)/SiO$_2$ (18)/SnO$_2$:F (175)/SiO$_2$ (38) |
| Comparative Example 43 | — | Face #2/Dielectric (22)/Ag (10)/Ti (1)/Dielectric (77)/Ag (12)/Ti (1)/Dielectric (36) | | — | Face #4/SnO$_2$ (25)/SiO$_2$ (25)/SnO$_2$:F (340) |
| Comparative Example 44 | — | Face #2/Dielectric (22)/Ag (10)/Ti (1)/Dielectric (77)/Ag (12)/Ti (1)/Dielectric (36) | | Face #3/Dielectric (22)/Ag (10)/Ti (1)/Dielectric (77)/Ag (12)/Ti (1)/Dielectric (36) | — |

TABLE 1G

| | Outdoor-side glass pane | | | Indoor-side glass pane | |
|---|---|---|---|---|---|
| | Face #1 | Face #2 | Gap layer | Face #3 | Face #4 |
| Example 51 | — | — | Vacuum Thickness 0.2 mm | Face #3/Dielectric (22)/Ag (14)/TiO$_x$ (4)/Dielectric (57) | Face #4/SnO$_2$ (20)/SiO$_2$ (21)/SnO$_2$:F (155)/SiO$_2$ (25) |
| Example 52 | — | — | | Face #3/Dielectric (22)/Ag (14)/TiOx (4)/Dielectric (57) | Face #4/SnO$_2$ (18)/SiO$_2$ (18)/SnO$_2$:F (175)/SiO$_2$ (38) |

TABLE 1H

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Example 61 | — | Face #2/Dielectric (14)/Ag (14)/TiO$_x$ (4)/Dielectric (76)/Ag (14)/TiO$_x$ (3)/Dielectric (35) | Argon Thickness 9 mm | — | — | Vacuum Thickness 0.2 mm | Face #5/Dielectric (22)/Ag (14)/TiO$_x$ (4)/Dielectric (57) | Face #6/SnO$_2$ (18)/SiO$_2$ (18)/SnO$_2$:F (175)/SiO$_2$ (38) |
| Example 62 | — | Face #2/Dielectric (14)/Ag (14)/TiO$_x$ (4)/Dielectric (76)/Ag (14)/TiO$_x$ (3)/Dielectric (35) | | — | — | | Face #5/Dielectric (22)/Ag (14)/TiO$_x$ (4)/Dielectric (57) | Face #6/SnO$_2$ (20)/SiO$_2$ (21)/SnO$_2$:F (155)/SiO$_2$ (25) |
| Example 63 | — | Face #2/Dielectric (14)/Ag (14)/TiO$_x$ (4)/Dielectric (76)/Ag (14)/TiO$_x$ (3)/Dielectric (35) | | — | — | | Face #5/Dielectric (22)/Ag (14)/TiO$_x$ (4)/Dielectric (57) | Face #6/SnO$_2$ (25)/SiO$_2$ (25)/SnO$_2$:F (340)/SiO$_2$ (40) |
| Example 64 | — | Face #2/Dielectric (14)/Ag (14)/TiO$_x$ (4)/Dielectric (76)/Ag (14)/TiO$_x$ (3)/Dielectric (35) | | — | — | | Face #5/Dielectric (22)/Ag (10)/Ti (1)/Dielectric (77)/Ag (12)/Ti (1)/Dielectric (36) | Face #6/SnO$_2$ (25)/SiO$_2$ (25)/SnO$_2$:F (340)/SiO$_2$ (40) |

TABLE 1I

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Comparative Example 61 | — | Face #2/Dielectric (14)/Ag (14)/TiO$_x$ (4)/Dielectric (76)/Ag (14)/TiO$_x$ (3)/Dielectric (35) | Argon Thickness 9 mm | — | — | Vacuum Thickness 0.2 mm | Face #5/Dielectric (22)/Ag (14)/TiO$_x$ (4)/Dielectric (57) | — |
| Comparative Example 62 | Face #1/SnO$_2$ (25)/SiO$_2$ (25)/SnO$_2$:F (340)/SiO$_2$ (40) | Face #2/Dielectric (22)/Ag (10)/Ti (1)/Dielectric (77)/Ag (12)/Ti (1)/Dielectric (36) | | — | — | | — | Face #6/SnO$_2$ (25)/SiO$_2$ (25)/SnO$_2$:F (340)/SiO$_2$ (40) |
| Comparative Example 63 | Face #1/SnO$_2$ (25)/SiO$_2$ (25)/SnO$_2$:F (340)/SiO$_2$ (40) | Face #2/Dielectric (22)/Ag (10)/Ti (1)/Dielectric (77)/Ag (12)/Ti (1)/Dielectric (36) | | — | — | | Face #5/Dielectric (14)/Ag (14)/TiO$_x$ (4)/Dielectric (76)/Ag (14)/TiO$_x$ (3)/Dielectric (35) | — |
| Comparative Example 64 | Face #1/SnO$_2$ (25)/SiO$_2$ (25)/SnO$_2$:F (340)/SiO$_2$ (40) | — | | — | — | | Face #5/Dielectric (22)/Ag (10)/Ti (1)/Dielectric (77)/Ag (12)/Ti (1)/Dielectric (36) | Face #6/SnO$_2$ (25)/SiO$_2$ (25)/SnO$_2$:F (340)/SiO$_2$ (40) |

TABLE 1J

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Example 71 | — | Face #2/Dielectric (14)/Ag (14)/TiO$_x$ (4)/Dielectric (76)/Ag (14)/TiO$_x$ (3)/Dielectric (35) | Air Thickness 12 mm | — | — | Air Thickness 12 mm | Face #5/Dielectric (14)/Ag (14)/TiO$_x$ (4)/Dielectric (76)/Ag (14)/TiO$_x$ (3)/Dielectric (35) | Face #6/SnO$_2$ (18)/SiO$_2$ (18)/SnO$_2$:F (175)/SiO$_2$ (38) |

TABLE 1J-continued

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Example 72 | — | Face #2/Dielectric (14)/Ag (14)/TiO$_x$ (4)/Dielectric (76)/Ag (14)/TiO$_x$ (3)/Dielectric (35) | | — | — | | Face #5/Dielectric (14)/Ag (14)/TiO$_x$ (4)/Dielectric (76)/Ag (14)/TiO$_x$ (3)/Dielectric (35) | Face #6/SnO$_2$ (20)/SiO$_2$ (21)/SnO$_2$:F (155)/SiO$_2$ (25) |
| Example 73 | — | — | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | Face #6/SnO$_2$ (18)/SiO$_2$ (18)/SnO$_2$:F (175)/SiO$_2$ (38) |
| Example 74 | — | — | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | Face #6/SnO$_2$ (20)/SiO$_2$ (21)/SnO$_2$:F (155)/SiO$_2$ (25) |

TABLE 1K

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Comparative Example 71 | — | Face #2/Dielectric (14)/Ag (14)/TiO$_x$ (4)/Dielectric (76)/Ag (14)/TiO$_x$ (3)/Dielectric (35) | Air Thickness 12 mm | — | — | Air Thickness 12 mm | Face #5/Dielectric (14)/Ag (14)/TiO$_x$ (4)/Dielectric (76)/Ag (14)/TiO$_x$ (3)/Dielectric (35) | — |
| Comparative Example 72 | — | — | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | — |
| Comparative Example 73 | — | Face #2/Dielectric (14)/Ag (14)/TiO$_x$ (4)/Dielectric (76)/Ag (14)/TiO$_x$ (3)/Dielectric (35) | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | — |
| Comparative Example 74 | — | Face #2/Dielectric (14)/Ag (14)/TiO$_x$ (4)/Dielectric (76)/Ag (14)/TiO$_x$ (3)/Dielectric (35) | | — | Face #4/Dielectric (14)/Ag (14)/TiO$_x$ (4)/Dielectric (76)/Ag (14)/TiO$_x$ (3)/Dielectric (35) | | Face #5/Dielectric (14)/Ag (14)/TiO$_x$ (4)/Dielectric (76)/Ag (14)/TiO$_x$ (3)/Dielectric (35) | — |
| Comparative Example 75 | Face #1/SnO$_2$ (18)/SiO$_2$ (18)/SnO$_2$:F (175)/SiO$_2$ (38) | Face #2/Dielectric (14)/Ag (14)/TiO$_x$ (4)/Dielectric (76)/Ag (14)/TiO$_x$ (3)/Dielectric (35) | | — | — | | Face #5/Dielectric (14)/Ag (14)/TiO$_x$ (4)/Dielectric (76)/Ag (14)/TiO$_x$ (3)/Dielectric (35) | — |

TABLE 1L

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Comparative Example 76 | Face #1/SnO$_2$ (18)/SiO$_2$ (18)/SnO$_2$:F (175)/SiO$_2$ (38) | Face #2/Dielectric (14)/Ag (14)/TiO$_x$ (4)/Dielectric (76)/Ag (14)/TiO$_x$ (3)/Dielectric (35) | Air Thickness 12 mm | — | Face #4/Dielectric (14)/Ag (14)/TiO$_x$ (4)/Dielectric (76)/Ag (14)/TiO$_x$ (3)/Dielectric (35) | Air Thickness 12 mm | — | — |
| Comparative Example 77 | — | — | | Face #3/Dielectric (14)/Ag (14)/TiO$_x$ (4)/Dielectric (76)/Ag (14)/TiO$_x$ (3)/Dielectric (35) | Face #4/Dielectric (14)/Ag (14)/TiO$_x$ (4)/Dielectric (76)/Ag (14)/TiO$_x$ (3)/Dielectric (35) | — | — | Face #6/SnO$_2$ (20)/SiO$_2$ (21)/SnO$_2$:F (155)/SiO$_2$ (25) |

TABLE 1L-continued

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Comparative Example 78 | — | Face #2/Dielectric (14)/Ag (14)/TiO$_x$ (4)/Dielectric (76)/Ag (14)/TiO$_x$ (3)/Dielectric (35) | | — | Face #4/Dielectric (14)/Ag (14)/TiO$_x$ (4)/Dielectric (76)/Ag (14)/TiO$_x$ (3)/Dielectric (35) | | — | Face #6/SnO$_2$ (20)/SiO$_2$ (21)/SnO$_2$:F (155)/SiO$_2$ (25) |

TABLE 1M

| | Outdoor-side glass pane | | | Middle glass pane | | | Indoor-side glass pane | |
|---|---|---|---|---|---|---|---|---|
| | Face #1 | Face #2 | Gap layer | Face #3 | Face #4 | Gap layer | Face #5 | Face #6 |
| Example 81 | — | Face #2/Dielectric (14)/Ag (14)/TiO$_x$ (4)/Dielectric (76)/Ag (14)/TiO$_x$ (3)/Dielectric (35) | Argon Thickness 12 mm | — | — | Argon Thickness 12 mm | Face #5/Dielectric (14)/Ag (14)/TiO$_x$ (4)/Dielectric (76)/Ag (14)/TiO$_x$ (3)/Dielectric (35) | Face #6/SnO$_2$ (18)/SiO$_2$ (18)/SnO$_2$:F (175)/SiO$_2$ (38) |
| Example 82 | — | Face #2/Dielectric (14)/Ag (14)/TiO$_x$ (4)/Dielectric (76)/Ag (14)/TiO$_x$ (3)/Dielectric (35) | | — | — | | Face #5/Dielectric (14)/Ag (14)/TiO$_x$ (4)/Dielectric (76)/Ag (14)/TiO$_x$ (3)/Dielectric (35) | Face #6/SnO$_2$ (20)/SiO$_2$ (21)/SnO$_2$:F (155)/SiO$_2$ (25) |
| Example 83 | — | — | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | Face #6/SnO$_2$ (18)/SiO$_2$ (18)/SnO$_2$:F (175)/SiO$_2$ (38) |
| Example 84 | — | — | | Face #3/Dielectric (14)/Ag (14)/TiO$_x$ (4)/Dielectric (76)/Ag (14)/TiO$_x$ (3)/Dielectric (35) | — | | Face #5/Dielectric (14)/Ag (14)/TiO$_x$ (4)/Dielectric (76)/Ag (14)/TiO$_x$ (3)/Dielectric (35) | Face #6/SnO$_2$ (20)/SiO$_2$ (21)/SnO$_2$:F (155)/SiO$_2$ (25) |

TABLE 2A

| | Multiple-glazed glass unit | | | Reflection at face #1 | | | | | Reflection at face #4 | | |
|---|---|---|---|---|---|---|---|---|---|---|---|
| | U-value | | Tvis | | a* | b* | a* | b* | | | |
| | W/(m$^2$K) | SHGC | (%) | R (%) | (5°) | (5°) | (45°) | (45°) | R (%) | a* | b* |
| Example 1 | 1.4 | 0.41 | 53.8 | 16.3 | −17.2 | 0.0 | −9.3 | −8.7 | 18.2 | −13.0 | 8.5 |
| Example 2 | 1.5 | 0.41 | 52.1 | 19.3 | −18.5 | −2.0 | — | — | 21.4 | −9.3 | −1.8 |
| Example 3 | 1.5 | 0.45 | 64.7 | 12.9 | −5.7 | 1.0 | — | — | 10.8 | −5.2 | −0.6 |
| Example 4 | 1.5 | 0.45 | 58.3 | 17.0 | −12.5 | 2.2 | — | — | 18.0 | −7.0 | 11.2 |
| Example 5 | 1.5 | 0.41 | 51.3 | 16.1 | −14.2 | −1.2 | — | — | 19.9 | −7.9 | 4.2 |
| Example 6 | 1.5 | 0.41 | 51.4 | 16.3 | −15.3 | −1.2 | — | — | 20.8 | −11.0 | 4.8 |
| Example 7 | 1.4 | 0.41 | 56.5 | 12.6 | −0.7 | −2.5 | 0.8 | −2.3 | 14.0 | −7.5 | 0.7 |
| Example 8 | 1.5 | 0.48 | 66.4 | 14.3 | −3.2 | −2.6 | −4.8 | −1.8 | 14.0 | −3.2 | −7.9 |
| Example 9 | 1.5 | 0.48 | 66.7 | 13.9 | −3.2 | −2.8 | −6.7 | −0.4 | 13.4 | −3.1 | −6.1 |
| Comparative Example 1 | 2.9 | 0.76 | 74.5 | — | — | — | — | — | — | — | — |
| Comparative Example 2 | 1.6 | 0.39 | 69.1 | 13.6 | — | — | — | — | 13.6 | — | — |
| Comparative Example 3 | 1.6 | 0.29 | 52.8 | 20.4 | −10.1 | −1.3 | −1.4 | −7.9 | 18.9 | −18.9 | −1.7 |
| Comparative Example 4 | 1.4 | 0.29 | 60.4 | 12.1 | −2.7 | −0.5 | — | — | 14.7 | −2.9 | 2.5 |
| Comparative Example 5 | 1.4 | 0.43 | 59.6 | 13.3 | −3.9 | 1.8 | — | — | 13.6 | −2.1 | 0.3 |
| Comparative Example 6 | 1.6 | 0.35 | 56.3 | 10.1 | −5.4 | −4.2 | — | — | 10.1 | −5.4 | −4.2 |
| Comparative Example 7 | 1.5 | 0.36 | 63.6 | 13.2 | −4.7 | −3.4 | — | — | 15.8 | −9.9 | 3.2 |
| Comparative Example 8 | 1.5 | 0.36 | 63.0 | 13.6 | −5.5 | 0.2 | — | — | 16.4 | −11.1 | 10.4 |

TABLE 2A-continued

| | | Low-E film on face #4 | | | |
|---|---|---|---|---|---|
| | | Ra (nm) | RΔq (nm) | Decontamination properties against fingerprint | Decontamination properties against felt pen | Decontamination properties against lipstick |
| Example 1 | | 12.3 | 0.75 | OK | OK | OK |
| Example 2 | | 11.8 | 0.73 | OK | OK | OK |
| Example 3 | | 11.8 | 0.73 | OK | OK | OK |
| Example 4 | | 11.8 | 0.73 | OK | OK | OK |
| Example 5 | | 11.1 | 0.72 | OK | OK | OK |
| Example 6 | | 9.8 | 0.70 | OK | OK | OK |
| Example 7 | | 12.3 | 0.75 | OK | OK | OK |
| Example 8 | | 7.7 | 0.41 | OK | OK | OK |
| Example 9 | | 7.6 | 0.42 | OK | OK | OK |
| Comparative Example 1 | | — | — | OK | OK | OK |
| Comparative Example 2 | | — | — | OK | OK | OK |
| Comparative Example 3 | | — | — | OK | OK | OK |
| Comparative Example 4 | | 14.5 | 0.89 | NG | NG | NG |
| Comparative Example 5 | | 14.5 | 0.89 | NG | NG | NG |
| Comparative Example 6 | | — | — | OK | OK | OK |
| Comparative Example 7 | | — | — | OK | OK | OK |
| Comparative Example 8 | | — | — | OK | OK | OK |

TABLE 2B

| | Multiple-glazed glass unit | | Reflection at face #1 | | | | Reflection at face #4 | | |
|---|---|---|---|---|---|---|---|---|---|
| | U-value W/(m²K) | SHGC | Tvis (%) | R (%) | a* (5°) | b* (5°) | R (%) | a* | b* |
| Example 11 | 1.2 | 0.41 | 53.8 | 16.3 | −17.2 | 0.0 | 18.2 | −13.0 | 8.5 |
| Example 12 | 1.2 | 0.41 | 52.1 | 19.3 | −18.5 | −2.0 | 21.4 | −9.3 | −1.8 |
| Example 13 | 1.2 | 0.45 | 64.7 | 12.9 | −5.7 | 1.0 | 10.8 | −5.2 | −0.6 |
| Example 14 | 1.2 | 0.41 | 51.3 | 16.1 | −14.2 | −1.2 | 19.9 | −7.9 | 4.2 |
| Example 15 | 1.2 | 0.41 | 51.4 | 16.3 | −15.3 | −1.2 | 20.8 | −11.0 | 4.8 |
| Example 16 | 1.2 | 0.48 | 65.1 | 16.0 | −1.4 | −3.0 | 15.0 | −2.2 | −6.1 |
| Example 17 | 1.2 | 0.48 | 66.7 | 13.9 | −3.2 | −2.8 | 13.4 | −3.1 | −6.1 |
| Example 21 | 1.6 | 0.63 | 74.3 | 14.6 | −3.5 | 0.3 | 15.1 | −4.9 | 0.8 |
| Example 22 | 1.6 | 0.62 | 71.7 | 15.3 | −5.3 | 3.1 | 16.0 | −8.0 | 6.2 |
| Example 31 | 1.4 | 0.63 | 74.3 | 14.6 | −3.5 | 0.3 | 15.1 | −4.9 | 0.8 |
| Example 32 | 1.4 | 0.62 | 71.7 | 15.3 | −5.3 | 3.1 | 16.0 | −8.0 | 6.2 |

| | Low-E film on face #4 | | | | |
|---|---|---|---|---|---|
| | Ra (nm) | RΔq (nm) | Decontamination properties against fingerprint | Decontamination properties against felt pen | Decontamination properties against lipstick |
| Example 11 | 12.3 | 0.75 | OK | OK | OK |
| Example 12 | 11.8 | 0.73 | OK | OK | OK |
| Example 13 | 11.8 | 0.73 | OK | OK | OK |
| Example 14 | 11.1 | 0.72 | OK | OK | OK |
| Example 15 | 9.8 | 0.70 | OK | OK | OK |
| Example 16 | 7.7 | 0.41 | OK | OK | OK |
| Example 17 | 7.6 | 0.42 | OK | OK | OK |
| Example 21 | 7.7 | 0.41 | OK | OK | OK |
| Example 22 | 7.6 | 0.42 | OK | OK | OK |
| Example 31 | 7.7 | 0.41 | OK | OK | OK |
| Example 32 | 7.6 | 0.42 | OK | OK | OK |

TABLE 2C

| | Multiple-glazed glass unit | | | Reflection at face #1 | | | Reflection at face #4 | | |
|---|---|---|---|---|---|---|---|---|---|
| | U-value | | Tvis | | a* | b* | | a* | b* |
| | W/(m²K) | SHGC | (%) | R (%) | (5°) | (5°) | R (%) | | |
| Example 41 | 0.9 | 0.49 | 69.7 | 14.4 | −6.3 | 3.2 | 14.5 | −6.4 | 1.6 |
| Example 42 | 0.9 | 0.47 | 65.2 | 16.8 | −7.0 | 6.8 | 17.7 | −6.9 | 7.4 |
| Comparative Example 41 | 0.9 | 0.40 | 69.7 | 13.5 | −5.3 | 1.0 | 15.3 | −7.1 | 3.3 |
| Comparative Example 42 | 0.9 | 0.40 | 69.0 | 13.9 | −6.1 | 5.5 | 15.8 | −8.5 | 10.8 |
| Comparative Example 43 | 0.9 | 0.39 | 68.5 | 12.7 | −2.6 | 0.0 | 14.5 | −3.6 | 0.2 |
| Comparative Example 44 | 0.9 | 0.38 | 67.7 | 9.1 | −3.2 | 0.2 | 9.1 | −3.2 | 0.2 |

| | | | Low-E film on face #4 | | |
|---|---|---|---|---|---|
| | Ra (nm) | RΔq (nm) | Decontamination properties against fingerprint | Decontamination properties against felt pen | Decontamination properties against lipstick |
| Example 41 | 7.7 | 0.41 | OK | OK | OK |
| Example 42 | 7.6 | 0.42 | OK | OK | OK |
| Comparative Example 41 | 7.7 | 0.41 | OK | OK | OK |
| Comparative Example 42 | 7.6 | 0.42 | OK | OK | OK |
| Comparative Example 43 | 14.5 | 0.89 | NG | NG | NG |
| Comparative Example 44 | — | — | OK | OK | OK |

TABLE 2D

| | Multiple-glazed glass unit | | | Reflection at face #1 | | | Reflection at face #4 | | |
|---|---|---|---|---|---|---|---|---|---|
| | U-value | | Tvis | | a* | b* | | a* | b* |
| | W/(m²K) | SHGC | (%) | R (%) | (5°) | (5°) | R (%) | | |
| Example 51 | 1.0 | 0.53 | 65.9 | 22.3 | −4.0 | −5.4 | 24.7 | −4.7 | −6.3 |
| Example 52 | 1.0 | 0.53 | 65.3 | 22.7 | −4.3 | −3.0 | 25.1 | −5.4 | −2.6 |

| | | | Low-E film on face #4 | | |
|---|---|---|---|---|---|
| | Ra (nm) | RΔq (nm) | Decontamination properties against fingerprint | Decontamination properties against felt pen | Decontamination properties against lipstick |
| Example 51 | 7.7 | 0.41 | OK | OK | OK |
| Example 52 | 7.6 | 0.42 | OK | OK | OK |

TABLE 2E

| | Multiple-glazed glass unit | | | Reflection at face #1 | | | Reflection at face #6 | | |
|---|---|---|---|---|---|---|---|---|---|
| | U-value | | Tvis | | a* | b* | | a* | b* |
| | W/(m²K) | SHGC | (%) | R (%) | (5°) | (5°) | R (%) | | |
| Example 61 | 0.668 | 0.31 | 50.6 | 22.2 | −5.6 | 0.2 | 27.9 | −7.4 | −1.2 |
| Example 62 | 0.671 | 0.31 | 51.1 | 22.0 | −5.4 | −1.2 | 27.5 | −6.8 | −4.6 |
| Example 63 | 0.658 | 0.31 | 50.9 | 21.5 | −4.4 | −1.2 | 25.9 | −5.7 | −3.8 |
| Example 64 | 0.647 | 0.32 | 53.6 | 16.7 | −4.6 | 3.0 | 16.1 | −7.6 | 4.5 |
| Comparative Example 61 | 0.696 | 0.31 | 54.0 | 20.8 | −4.1 | −2.2 | 26.1 | −4.7 | −7.3 |
| Comparative Example 62 | 1.068 | 0.35 | 58.6 | 21.6 | −8.9 | 10.4 | 22.2 | −9.5 | 11.9 |

TABLE 2E-continued

|  | | | | | | | | |
|---|---|---|---|---|---|---|---|---|
| Comparative Example 63 | 0.692 | 0.32 | 53.1 | 18.9 | −10.0 | 8.5 | 17.0 | −6.9 | 5.5 |
| Comparative Example 64 | 0.781 | 0.42 | 59.5 | 20.0 | −4.2 | 4.7 | 17.7 | −4.6 | 4.7 |

| | Low-E film on face #6 | | | |
|---|---|---|---|---|
| | Ra (nm) | RΔq (nm) | Decontamination properties against fingerprint | Decontamination properties against felt pen | Decontamination properties against lipstick |
| Example 61 | 7.6 | 0.42 | OK | OK | OK |
| Example 62 | 7.7 | 0.41 | OK | OK | OK |
| Example 63 | 12.3 | 0.75 | OK | OK | OK |
| Example 64 | 12.3 | 0.75 | OK | OK | OK |
| Comparative Example 61 | — | — | OK | OK | OK |
| Comparative Example 62 | 12.3 | 0.75 | OK | OK | OK |
| Comparative Example 63 | — | — | OK | OK | OK |
| Comparative Example 64 | 12.3 | 0.75 | OK | OK | OK |

TABLE 2F

| | Multiple-glazed glass unit | | | | Reflection at face #1 | | | Reflection at face #6 | | |
|---|---|---|---|---|---|---|---|---|---|---|
| | U-value W/(m²K) | SHGC | Tvis (%) | Likelihood of thermal fracture | R (%) | a* (5°) | b* (5°) | R (%) | a* | b* |
| Example 71 | 0.902 | 0.32 | 50.0 | NO | 19.3 | −7.7 | 7.6 | 19.5 | −13.1 | 11.5 |
| Example 72 | 0.907 | 0.32 | 50.5 | NO | 19.0 | −7.4 | 5.9 | 19.1 | −12.0 | 5.0 |
| Example 73 | 0.902 | 0.37 | 50.0 | NO | 19.2 | −11.6 | 9.0 | 19.6 | −11.0 | 10.9 |
| Example 74 | 0.907 | 0.37 | 50.5 | NO | 18.9 | −11.4 | 7.2 | 19.1 | −9.9 | 4.4 |
| Comparative Example 71 | 0.955 | 0.32 | 53.1 | NO | 16.8 | −6.6 | 2.2 | 16.8 | −6.6 | 2.2 |
| Comparative Example 72 | 0.955 | 0.37 | 53.1 | NO | 16.7 | −10.8 | 3.6 | 16.8 | −4.2 | 1.6 |
| Comparative Example 73 | 0.937 | 0.29 | 45.0 | NO | 14.9 | −10.5 | 3.7 | 16.2 | −6.7 | 2.3 |
| Comparative Example 74 | 0.936 | 0.29 | 45.0 | NO | 16.2 | −6.7 | 2.3 | 14.9 | −10.5 | 3.7 |
| Comparative Example 75 | 0.948 | 0.32 | 49.5 | NO | 20.5 | −9.7 | 8.8 | 17.4 | −8.9 | 5.5 |
| Comparative Example 76 | 0.948 | 0.30 | 49.5 | NO | 20.6 | −7.9 | 8.2 | 17.4 | −13.1 | 6.9 |
| Comparative Example 77 | 0.907 | 0.34 | 50.1 | YES | 18.3 | −9.5 | 3.6 | 18.3 | −12.1 | 5.0 |
| Comparative Example 78 | 0.907 | 0.29 | 50.1 | NO | 17.9 | −5.7 | 2.6 | 19.1 | −12.8 | 4.8 |

| | Low-E film on face #6 | | | |
|---|---|---|---|---|
| | Ra (nm) | RΔq (nm) | Decontamination properties against fingerprint | Decontamination properties against felt pen | Decontamination properties against lipstick |
| Example 71 | 7.6 | 0.42 | OK | OK | OK |
| Example 72 | 7.7 | 0.41 | OK | OK | OK |
| Example 73 | 7.6 | 0.42 | OK | OK | OK |
| Example 74 | 7.7 | 0.41 | OK | OK | OK |
| Comparative Example 71 | — | — | OK | OK | OK |
| Comparative Example 72 | — | — | OK | OK | OK |
| Comparative Example 73 | — | — | OK | OK | OK |
| Comparative Example 74 | — | — | OK | OK | OK |
| Comparative Example 75 | — | — | OK | OK | OK |

TABLE 2F-continued

| | | | | | |
|---|---|---|---|---|---|
| Comparative Example 76 | — | — | OK | OK | OK |
| Comparative Example 77 | 7.7 | 0.41 | OK | OK | OK |
| Comparative Example 78 | 7.7 | 0.41 | OK | OK | OK |

TABLE 2G

| | Multiple-glazed glass unit | | | | | | | | |
|---|---|---|---|---|---|---|---|---|---|
| | U-value | SHGC | Tvis (%) | Likelihood of thermal fracture | Reflection at face #1 | | | Reflection at face #6 | |
| | W/(m²K) | | | | R (%) | a* (5°) | b* (5°) | R (%) | a* | b* |
| Example 81 | 0.714 | 0.32 | 50.0 | NO | 19.3 | −7.7 | 7.6 | 19.5 | −13.1 | 11.5 |
| Example 82 | 0.718 | 0.32 | 50.5 | NO | 19.0 | −7.4 | 5.9 | 19.1 | −12.0 | 5.0 |
| Example 83 | 0.714 | 0.37 | 50.0 | NO | 19.2 | −11.6 | 9.0 | 19.6 | −11.0 | 10.9 |
| Example 84 | 0.718 | 0.37 | 50.5 | NO | 18.9 | −11.4 | 7.2 | 19.1 | −9.9 | 4.4 |

| | Low-E film on face #6 | | | | |
|---|---|---|---|---|---|
| | Ra (nm) | RΔq (nm) | Decontamination properties against fingerprint | Decontamination properties against felt pen | Decontamination properties against lipstick |
| Example 81 | 7.6 | 0.42 | OK | OK | OK |
| Example 82 | 7.7 | 0.41 | OK | OK | OK |
| Example 83 | 7.6 | 0.42 | OK | OK | OK |
| Example 84 | 7.7 | 0.41 | OK | OK | OK |

In Examples 1 to 9 listed in Table 1A, Comparative Examples 1 to 8 listed in Table 1B, and Examples 21 to 22 listed in Table 1D, multiple-glazed glass units including two glass panes and having a 12-mm-thick gap layer filled with air were fabricated. In Examples 11 to 17 listed in Table 1C and Examples 31 to 32 listed in Table 1E, multiple-glazed glass units including two glass panes and having a 12-mm-thick gap layer filled with argon gas were fabricated. The properties of these multiple-glazed glass units are shown in Table 2A and Table 2B.

As shown in Table 2A, the multiple-glazed glass units of Examples 1 to 9 showed good decontamination properties of the face #4 and showed lower U-values than the units of Comparative Examples 1 to 3 having no Low-E film or only one Low-E film formed on one face. The multiple-glazed glass units of Examples 1 to 9 showed higher SHGC values than the units of Comparative Examples 4, 7, and 8 having Low-E films on the face #2 and face #4. The multiple-glazed glass unit of Comparative Example 6 having Low-E films on the face #2 and face #3 showed a higher U-value and a lower SHGC value than the multiple-glazed glass units of Examples 1 to 9, despite the fact that both of the Low-E films formed on the two faces included two metal layers (Ag layers) and thus had good low-emissivity properties. The multiple-glazed glass units of Examples 1 to 9 showed better decontamination properties of the face #4 than the units of Comparative Examples 4 and 5 in which the face #4 had a Ra of more than 14 nm.

Among the multiple-glazed glass units of Examples 1 to 9, those of Examples 1 and 7 showed a particularly low U-value. In both of the units of Examples 1 and 7, the sum of the thicknesses d3 and d4 of the Ag layers (metal layers) was 27 nm or more. The unit of Example 1 in which the ratio d4/d3 described above between the thicknesses of the Ag layers (metal layers) was 1.15 or more showed less incident angle dependence of the reflected color than the unit of Example 7 in which the ratio d4/d3 was less than 1.15. More specifically, in Example 7, the a* value varied from a negative to a positive and the hue of the reflected color varied from a greenish hue to a reddish hue with the change in incident angle from 5° to 45°, while in Example 1, the a* value remained negative and the hue of the reflected color kept greenish despite the change in incident angle. For the units of Examples 8 and 9 in which the sum of the thicknesses of the Ag layers on the face #3 was less than 27 nm, the a* value remained negative and the hue of the reflected color kept greenish despite the change in incident angle, which means that the incident angle dependence of the reflected color was reduced, irrespective of the above ratio d4/d3. Furthermore, the units of Examples 3, 4, 8, and 9, in which the sum of the thicknesses of the Ag layers on the face #3 was less than 27 nm, showed higher SHGC values than the units of Examples 1, 2, and 5 to 7 in which the sum of the thicknesses of the Ag layers on the face #3 was 27 nm or more.

Examples 11 to 17, Examples 21 to 22, and Examples 31 to 32 listed in Table 2B showed the same trend as Examples 1 to 9 listed in Table 2A. The U-values in Examples 21 to 22 were equal to that in Comparative Example 6. This demonstrates that the configurations of Examples 21 to 22 provided a beneficial effect on the decrease in U-value, given that each of the Low-E films having a metal layer in Comparative Example 6 had two metal layers and thus intrinsically had good low-emissivity properties, while each of the Low-E films having a metal layer in Examples 21 to 22 had only one metal layer. In addition, the SHGC values in Examples 21 to 22 were higher than those in Comparative Examples 1 to 8. Furthermore, when the units of Examples 11 to 17 and Examples 31 to 32 having an argon gap layer are compared with the units of Examples 1 to 9 and Examples 21 to 22 having an air gap layer, it is seen that the former showed lower U-values than the latter insofar as the configurations of the Low-E films were identical.

In Examples 41 to 42 and Comparative Examples 41 to 44 listed in Table 1F and Examples 51 to 52 listed in Table 1G, multiple-glazed glass units including two glass panes and having a 0.2-mm-thick vacuum gap layer were fabricated. The properties of these multiple-glazed glass units are shown in Table 2C and Table 2D.

As shown in Table 2C and Table 2D, Examples 41 to 42, Examples 51 to 52, and Comparative Examples 41 to 44 showed the same trend as Examples 1 to 9 and Comparative Examples 1 to 8 listed in Table 2A. Comparison of the units of Examples 41 to 42 and Examples 51 to 52 having a vacuum gap layer with the units of the other Examples including two glass panes and having an air or argon gap layer reveals that the former showed lower U-values than the latter when the configurations of the Low-E films were identical. Although the U-values in Examples 51 to 52 were higher than those in Comparative Examples 41 to 44, the configurations of Examples 51 to 52 can be considered to have provided a beneficial effect on the decrease in U-value, given that each of the Low-E films having a metal layer in Comparative Examples 41 to 44 had two metal layers, while each of the Low-E films having a metal layer in Examples 51 to 52 had only one metal layer.

In Examples 61 to 64 listed in Table 1H and Comparative Examples 61 to 64 listed in Table 1I, multiple-glazed glass units including three glass panes and having two gap layers one of which was a 0.2-mm-thick vacuum gap layer were fabricated. The properties of these multiple-glazed glass units are shown in Table 2E.

As shown in Table 2E, among the units having three Low-E films, particularly among the units of Examples 61 to 64 and Comparative Examples 62 to 64 in which no Low-E film was formed on both principal surfaces of the middle glass pane, the units of Examples 61 to 64 in which Low-E films were formed on both principal surfaces (face #5 and face #6) of the glass pane closest to the indoor space yielded very low U-values. In addition, the U-values achieved in Examples 61 to 64 were much lower than that in Comparative Example 61 in which two Low-E films were formed.

In Examples 71 to 74, Comparative Examples 71 to 78, and Examples 81 to 84 listed in Tables 1J to 1M, multiple-glazed glass units including three glass panes and having two gap layers both of which were filled with gas (air or argon) were fabricated. The properties of these multiple-glazed glass units are shown in Table 2F and Table 2G.

Table 2F and Table 2G show, for Examples 71 to 74, Comparative Examples 71 to 78, and Examples 81 to 84, that Examples 71 to 74 and Examples 81 to 84 in which Low-E films were formed on both principal surfaces (face #5 and face #6) of the glass pane closest to the indoor space yielded lower U-values than Comparative Examples 71 to 78, and that the former yielded higher SHGC values than the latter when the numbers of the Low-E films were equal. Furthermore, in Comparative Example 77 in which Low-E films were formed on both principal surfaces (face #3 and face #4) of the middle glass pane of the three glass panes, the determination "YES" was made for the likelihood of thermal fracture.

More specifically, among Examples 71 to 74, Examples 81 to 84, and Comparative Examples 73 to 78 in which three Low-E films were formed, Examples 71 to 74 and Examples 81 to 84 yielded very low U-values; in these Examples, Low-E films were formed on both principal surfaces (face #5 and face #6) of the glass pane closest to the indoor space and on either that principal surface (face #2) of the glass pane closest to the outdoor space which faced the gap layer or that principal surface (face #3) of the middle glass pane which faced the outdoor space. The units of Comparative Examples 75 and 76 had configurations in which the orders of arrangement of the constituent elements from the face #1 to the face #6 were reverse to those in the units of Examples 71 and 73, respectively. The units of Comparative Examples 75 and 76 showed high U-values and were significantly inferior in this respect to the units of Examples 71 and 73, although their SHGC values were similar.

The unit of Comparative Example 78 was one in which three Low-E films were formed, similar to those of Examples 72 and 74. However, the unit of Comparative Example 78, in which no Low-E film was formed on the two principal surfaces #5 and #6, showed a low SHGC value and was inferior in this respect to the units of Examples 72 and 74, although their U-values were equal. The units of Comparative Examples 73 and 74, despite having three Low-E films all of which had two metal layers, showed high U-values and were inferior to the units of Examples 71 to 74 and Examples 81 to 84 having three Low-E films only two of which had two metal layers. The units of Examples 71 to 74 and Examples 81 to 84 yielded much lower U-values than the units of Comparative Examples 71 and 72 in which two Low-E films were formed.

Next, 3.0-mm-thick float glass panes identical to the glass panes used in Examples and Comparative Examples described above were prepared, and they were each cut to a predetermined size. As shown in Table 3 below, a Low-E film was formed only on one principal surface of each glass pane. For each glass pane on which a Low-E film was formed, the roughness and decontamination properties of the surface of the Low-E film were evaluated without producing multiple-glazed glass units. The results are shown as those for Comparative Examples 91 and 92 in Table 3.

TABLE 3

| | Low-E film | Ra (nm) | RΔq | Decontamination properties against fingerprint | Decontamination properties against felt pen | Decontamination properties against lipstick |
|---|---|---|---|---|---|---|
| Comparative Example 91 | (Glass surface/) $SnO_2$ (25)/$SiO_2$ (25)/$SnO_2$:F (240) | 12.8 | 0.89 | NG | NG | NG |
| Comparative Example 92 | (Glass surface/)$SnO_2$ (25)/$SiO_2$ (25)/$SnO_2$:F (450) | 15.8 | 0.92 | NG | NG | NG |

Figure 5:
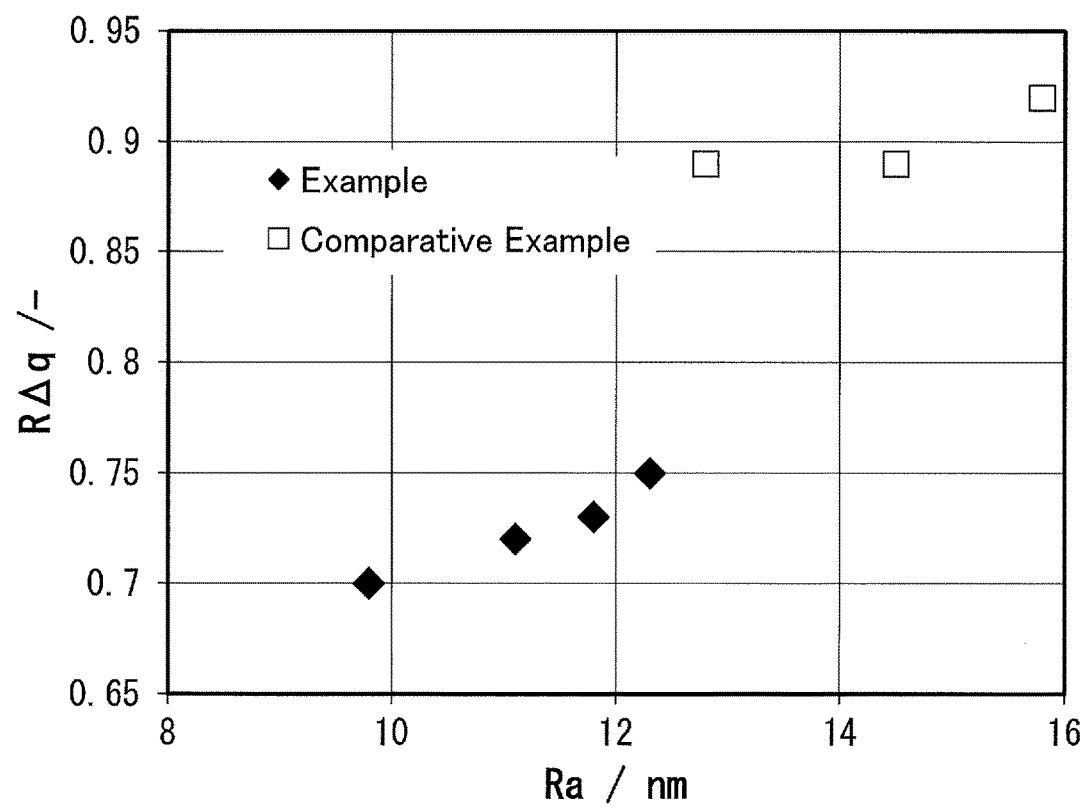
FIG. 5 is a graph showing the relationship between the arithmetic average roughness Ra and the root-mean-square slope RΔq of a roughness profile for the Low-E film-coated surfaces of Examples and Comparative Examples.

FIG. 5 shows the relationship between the arithmetic average roughness Ra and the root-mean-square slope RΔq of a roughness profile for the faces #4 in Examples 1 to 7 and Comparative Examples 4, 5, 91, and 92 (the surface on which a Low-E film was formed in Comparative Examples 91 and 92). As seen in FIG. 5, the Ra and the RΔq show good correlation among Examples and among Comparative Examples. However, the Ra and the RΔq show poor correlation between Examples and Comparative Examples. That is, it can be understood that the Low-E films of Examples having a second multilayer structure including an amorphous layer had smaller RΔq and hence better decontamination properties than a Low-E film having Ra equal to those of the Low-E films of Examples but including no amorphous layer.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The multiple-glazed glass units of the present invention can be widely used in window structures such as those of buildings and vehicles.

The invention claimed is:

1. A multiple-glazed glass unit adapted to separate an indoor space and an outdoor space, the multiple-glazed glass unit comprising:
a pair of glass panes opposed across a gap layer to be spaced at a predetermined distance from each other, wherein
a first low-emissivity film is formed on one principal surface of one of the pair of glass panes that is located closer to the indoor space, the one principal surface facing the gap layer, the first low-emissivity film has a first multilayer structure comprising:
a metal layer;
a sacrificial layer disposed on a surface of the metal layer facing the gap layer, the sacrificial layer being in contact with the metal layer; and
a pair of dielectric layers sandwiching the metal layer and the sacrificial layer;
a second low-emissivity film is formed on the other principal surface of the one glass pane, the other principal surface facing the indoor space, the second low-emissivity film has a second multilayer structure comprising, in order from the other principal surface on which the second low-emissivity film is formed:
an underlayer;
a transparent electrically-conductive oxide layer; and
an amorphous layer; and
the second low-emissivity film formed on the other principal surface facing the indoor space has an arithmetic average surface roughness Ra of 14 nm or less.

2. The multiple-glazed glass unit according to claim 1, wherein the amorphous layer has a thickness of less than 40 nm.

3. The multiple-glazed glass unit according to claim 1, wherein in the second low-emissivity film,
the transparent electrically-conductive oxide layer comprises a fluorine-doped tin oxide layer having a thickness of 120 nm or more,
the amorphous layer comprises a silica layer having a thickness of 15 to 70 nm, and
the following expression is satisfied: $d2 \geq d1 \times 0.11 + 1.4$ nm, where d1 represents a thickness of the transparent electrically-conductive oxide layer and d2 represents a thickness of the amorphous layer, and
the second low-emissivity film has an emissivity ε of 0.34 or less.

4. The multiple-glazed glass unit according to claim 1, wherein the first low-emissivity film has two first multilayer structures.

5. The multiple-glazed glass unit according to claim 4, wherein
a ratio d4/d3 is 1.15 or more, where d3 represents a thickness of the metal layer comprised in one of the two first multilayer structures that is farther from the principal surface on which the first low-emissivity film is formed, and d4 represents a thickness of the metal layer comprised in the other first multilayer structure closer to the principal surface, and
the thickness d3 is 6 nm or more.

6. The multiple-glazed glass unit according to claim 1, wherein a root-mean-square slope RΔq of a surface roughness profile of the second low-emissivity film is 0.77 or less.

7. The multiple-glazed glass unit according to claim 1, wherein the second low-emissivity film further has a functional layer.

8. The multiple-glazed glass unit according to claim 1, wherein a low-emissivity film is not formed on either of the principal surfaces of the other of the pair of glass panes that is located closer to the outdoor space.

9. The multiple-glazed glass unit according to claim 1, wherein the multiple-glazed glass unit has a thickness of 22 mm or less, a U-value of 1.6 (W/(m$^2$·K)) or less, a SHGC value of 0.4 to 0.7, and a visible light transmittance of 50 to 75%.

10. The multiple-glazed glass unit according to claim 1, comprising a figured glass pane or a wired glass pane located closer to the outdoor space than is the gap layer.

11. The multiple-glazed glass unit according to claim 1, further comprising: an additional glass pane disposed closer to the outdoor space than a pane of the pair of glass panes that is located closer to the outdoor space; and an additional gap layer, the additional glass pane being opposed to the pane of the pair of glass panes that is located closer to the outdoor space across the additional gap layer so that the additional glass pane and the pane of the pair of glass panes that is located closer to the outdoor space are spaced at a predetermined distance from each other.

12. A glass pane for a multiple-glazed glass unit, the glass pane being adapted to be a pane among a pair of glass panes that is located closer to an indoor space, the pair of glass panes being separated by a gap layer, wherein
the glass pane bears a first low-emissivity film formed on one principal surface thereof that faces the gap layer, and a second low-emissivity film formed on the other principal surface thereof,
the second low-emissivity film formed on the other principal surface has an arithmetic average surface roughness Ra of 14 nm or less, the first low-emissivity film has a first multilayer structure comprising:
a metal layer;
a sacrificial layer disposed on a surface of the metal layer facing the gap layer, the sacrificial layer being in contact with the metal layer; and
a pair of dielectric layers sandwiching the metal layer and the sacrificial layer, and
the second low-emissivity film has a second multilayer structure comprising, in order from the other principal surface on which the second low-emissivity film is formed:
an underlayer;
a transparent electrically-conductive oxide layer; and
an amorphous layer.

13. The glass pane for the multiple-glazed glass unit according to claim 12, wherein a root-mean-square slope RΔq of a surface roughness profile of the second low-emissivity film formed on the other principal surfaces is 0.77 or less.

14. A multiple-glazed glass unit adapted to separate an indoor space and an outdoor space, the multiple-glazed glass unit comprising three glass panes A, B, and C, wherein
the glass pane A and the glass pane B are opposed across a first gap layer to be spaced at a predetermined distance from each other,
the glass pane B and the glass pane C are opposed across a second gap layer to be spaced at a predetermined distance from each other,
the glass pane C is located closest to the indoor space among the glass panes A, B, and C,
a first low-emissivity film is formed on one principal surface of the glass pane C, the one principal surface facing the gap layer, wherein the first low-emissivity film has a first multilayer structure comprising:
a metal layer;
a sacrificial layer disposed on a surface of the metal layer facing the gap layer, the sacrificial layer being in contact with the metal layer; and
a pair of dielectric layers sandwiching the metal layer and the sacrificial layer;
a second low-emissivity film is formed on the other principal surface of the glass pane C, the other principal surface facing the indoor space, wherein the second low-emissivity film has a second multilayer structure comprising, in order from the other principal surface on which the second low-emissivity film is formed:
an underlayer;
a transparent electrically-conductive oxide layer; and
an amorphous layer;
a third low-emissivity film is formed on a principal surface of the glass pane A facing the glass pane B, the glass pane A being located closest to the outdoor space among the three glass panes or on a principal surface of the glass pane B facing the glass pane A, the glass pane B being located in the middle among the three glass panes, and
the second low-emissivity film formed on the other principal surface of the glass pane C facing the indoor space has an arithmetic average surface roughness Ra of 14 nm or less.

15. The multiple-glazed glass unit according to claim 1, wherein the gap layer is a vacuum layer.

16. The multiple-glazed glass unit according to claim 14, wherein the amorphous layer has a thickness less than 40 nm.

17. The multiple-glazed glass unit according to claim 14, wherein in the second low-emissivity film,
the transparent electrically-conductive oxide layer comprises a fluorine-doped tin oxide layer having a thickness of 120 nm or more,
the amorphous layer comprises a silica layer having a thickness of 15 to 70 nm, and
the following expression is satisfied: $d2 \geq d1 \times 0.11 + 1.4$ nm, where d1 represents a thickness of the transparent electrically-conductive oxide layer and d2 represents a thickness of the amorphous layer, and
the second low-emissivity film has an emissivity ε of 0.34 or less.

18. The multiple-glazed glass unit according to claim 14, wherein the first low-emissivity film has two first multilayer structures.

19. The multiple-glazed glass unit according to claim 18, wherein
a ratio d4/d3 is 1.15 or more, where d3 represents a thickness of the metal layer comprised in one of the two first multilayer structures that is farther from the principal surface on which the first low-emissivity film is formed, and d4 represents a thickness of the metal layer comprised in the other first multilayer structure closer to the principal surface, and
the thickness d3 is 6 nm or more.

20. The multiple-glazed glass unit according to claim 14, wherein the second gap layer is a vacuum layer.

* * * * *